US011893122B2

(12) United States Patent
Schwaderer

(10) Patent No.: US 11,893,122 B2
(45) Date of Patent: Feb. 6, 2024

(54) SHAPESHIFT DATA ENCRYPTION METHODS AND SYSTEMS

(71) Applicant: William David Schwaderer, Sparks, NV (US)

(72) Inventor: William David Schwaderer, Sparks, NV (US)

(*) Notice: Subject to any disclaimer, the term of this patent is extended or adjusted under 35 U.S.C. 154(b) by 0 days.

(21) Appl. No.: 18/000,798

(22) PCT Filed: Jun. 2, 2021

(86) PCT No.: PCT/US2021/035537
§ 371 (c)(1),
(2) Date: Dec. 5, 2022

(87) PCT Pub. No.: WO2021/247766
PCT Pub. Date: Dec. 9, 2021

(65) Prior Publication Data
US 2023/0222229 A1 Jul. 13, 2023

Related U.S. Application Data

(60) Provisional application No. 63/035,527, filed on Jun. 5, 2020.

(51) Int. Cl.
G06F 21/72 (2013.01)
G06F 21/76 (2013.01)
G06F 21/60 (2013.01)
G06F 21/78 (2013.01)
G06F 21/71 (2013.01)
H04L 9/22 (2006.01)

(52) U.S. Cl.
CPC ............ *G06F 21/602* (2013.01); *G06F 21/78* (2013.01)

(58) Field of Classification Search
None
See application file for complete search history.

(56) References Cited

U.S. PATENT DOCUMENTS

| 2015/0172045 A1 | 6/2015 | Leidich et al. |
| 2018/0176011 A1 | 6/2018 | Hars |
| 2018/0246702 A1 | 8/2018 | Kawai et al. |
| 2020/0153613 A1 | 5/2020 | Hale |

OTHER PUBLICATIONS

Heuristic Approach for Nonlinear n×n(3<=n=<7) Substitution-Boxes. Ahmad. Springer. (Year: 2018).*

(Continued)

*Primary Examiner* — Venkat Perungavoor
(74) *Attorney, Agent, or Firm* — McCoy Russell LLP

(57) ABSTRACT

A system can include: a plurality of processing Cores; a Package Interconnect communicatively coupled with the plurality of processing Cores; a Configurable LFSR PRV Generator Hardware Array means communicatively coupled with the Package Interconnect; a Galois Multiplication Hardware Accelerator means communicatively coupled with the Package Interconnect; an Extended Euclidian Algorithm Hardware Accelerator means communicatively coupled with the Package Interconnect; and a Fischer-Yates Shuffle Algorithm Hardware Accelerator means communicatively coupled with the Package Interconnect.

20 Claims, 11 Drawing Sheets

(56) References Cited

OTHER PUBLICATIONS

A Survey on Various Dynamic S-Box Implementation in Block Cipher Encryption Algorithm. Juremi. JATI. (Year: 2019).*
PUF-RAKE: A PUF-Based Robust and Lightweight Authentication and Key Establishment Protocol. Qureshi. IEEE. (Year: 2022).*
Randomized Substitution Method for Effectively Secure Block Cipher in I.O.T. Environment. Skouakat. Springer. (Year: 2020).*
ISA Korean Intellectual Property Office, International Search Report and Written Opinion Issued in Application No. PCT/US2021/035537, dated Sep. 23, 2021, 10 pages.

* cited by examiner

SHAPESHIFT DATA ENCRYPTION METHODS AND SYSTEMS

CROSS REFERENCE TO RELATED APPLICATIONS

The present application is a U.S. National Phase of International PCT Application No. PCT/US2021/035537, entitled "SHAPESHIFT DATA ENCRYPTION METHODS AND SYSTEMS," and filed on Jun. 2, 2021. International PCT Application No. PCT/US2021/035537 claims priority to U.S. Provisional Application No. 63/035,527, entitled "SHAPESHIFT DATA ENCRYPTION METHODS AND SYSTEMS," and filed on Jun. 5, 2020. The entire contents of the above-referenced applications are hereby incorporated by reference for all purposes.

FIELD

The present description relates generally to data encryption.

BACKGROUND/SUMMARY

An unconventional binary data encryption method employs deterministic chaos principles to perform a multiplicity of independent, discontinuous atomic encryption operations at arbitrary input plaintext bit boundaries. An independent, ShapeShifting pseudorandom value (PRV) sequence generator (PRVG) resource contextually provides PRVs for shaped value operation interpretations. The PRVG resource independently reselects or constructs other PRV generation resources, redefines or reconfigures itself, and dynamically initializes itself under PRV interpretation. Within a preliminary PRV sequence, the encryption method successively identifies arbitrarily-positioned contiguous bit values to create a value sequence it interprets. The encryption method interprets individual values within the sequence as independent tokens that specify initial encryption operational resources and their first initializations. Subsequent PRV interpretations during encryption operations identify associated PRVG resource configurations and operations, encryption phases, scopes, individual and group operations, operand and parameter values within operational contexts, and dynamic ShapeShift resource reselection, modification, jitter, and reinitialization interval specifics. Context-shaped tokenized PRV interpretations can determine ShapeShift data preconditioning, postconditioning, and atomic encryption operation order, concatenation, and cardinality attributes. Deterministically prepending, appending, and blending pseudorandom or truly random bit values in output encrypted data increases encryption ciphertext confusion. Decryption can use push/pop stack logic as one means to reverse encryption operations operation-by-operation under deterministic PRV interpretation. Optional novel hardware components can accelerate encryption and decryption operations.

DETAILED DESCRIPTION

The detailed description set forth below in connection with the appended drawings is intended as a description of example embodiments of a ShapeShift encryption and decryption method provided in accordance with the present invention and is not intended to represent the only forms in which the present invention may be constructed or utilized. The description sets forth features of the present invention in connection with the illustrated embodiments. However, the same or equivalent functions and structures may be accomplished by different embodiments that are also intended to be encompassed within the spirit and scope of the invention. As denoted elsewhere herein, like element numbers are intended to indicate like elements or features.

Figure 1:
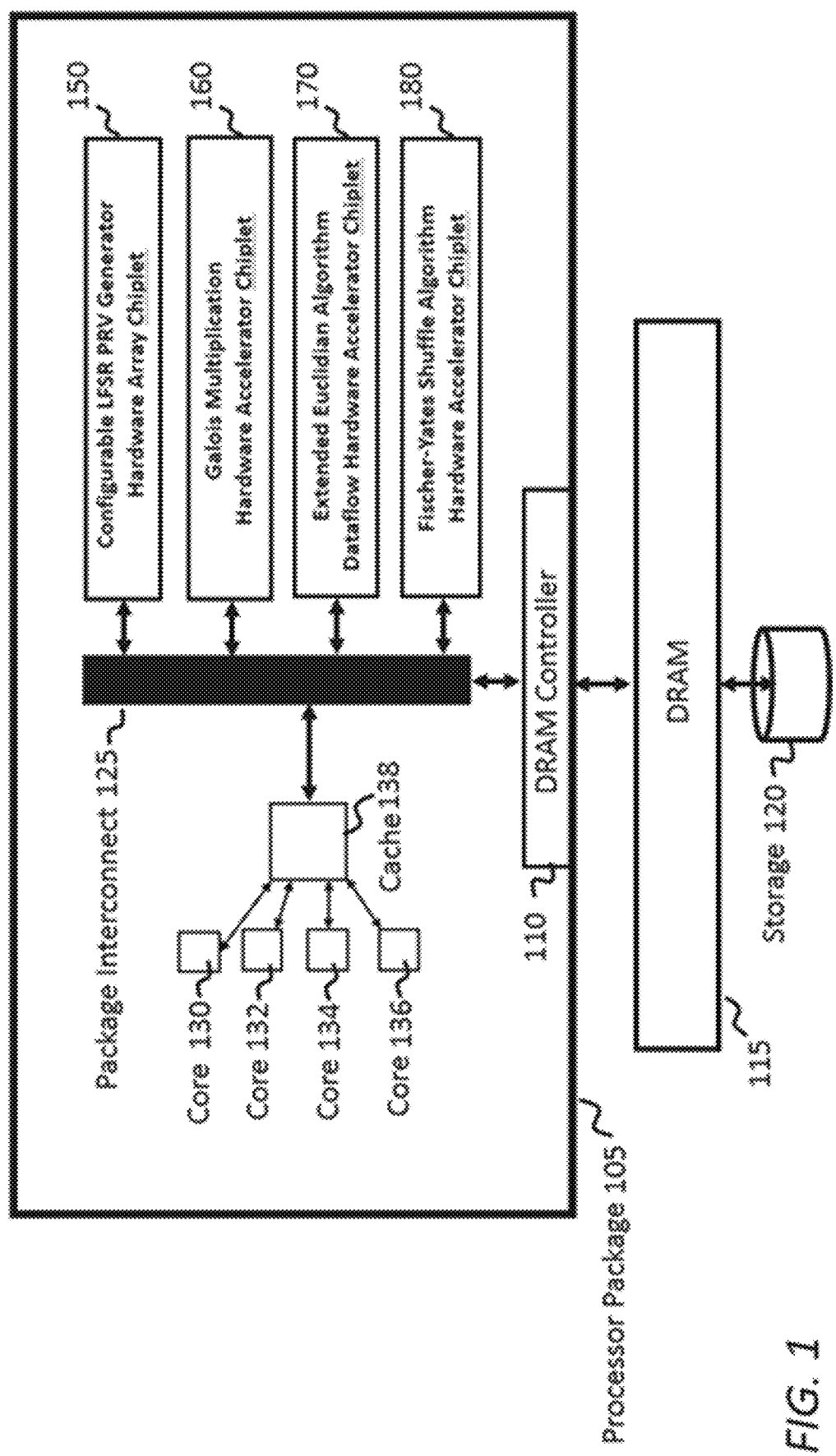
FIG. 1 depicts one example embodiment of the present invention that uses a processor chiplet design to provide hardware acceleration means for encryption operations.

In FIG. 1, a multi-core Processor Package 105 connects to traditional dynamic random-access memory (DRAM) 115 which in turn connects to traditional persistent Storage 120 means. Within the Processor Package 105, a DRAM Controller 110 provides a connection path to DRAM 115 and connects to the internal Package Interconnect 125 within the Processor Package 105.

In this example embodiment, the Processor Package 105 provides four processing Cores 130, 132, 134, and 136. Other embodiments can have a different number of processing cores. The core multiplicity connects to a shared Cache 138 which, in turn, connects to the Package Interconnect 125 which provides a data pathway to the DRAM Controller 110.

Also attaching to Package Interconnect 125 are a Configurable LFSR PRV Generator Hardware Array Chiplet 150, a Galois Multiplication Hardware Accelerator Chiplet 160, an Extended Euclidian Algorithm Dataflow Hardware Accelerator Chiplet 170, and a Fischer Yates Shuffle Algorithm Hardware Accelerator Chiplet 180.

The Configurable LFSR PRV Generator Hardware Array Chiplet 150 is an example means to generate pseudorandom values (PRVs) using a multiplicity of LFSRs whose individual length, feedback polynomial, jitter value, warm up cycle count, and algorithmic feedback discard method are configurable through a register-interface Cores 130, 132, 134, and 136 access through the Package Interconnect 125.

The Galois Multiplication Hardware Accelerator Chiplet 160, has a register-interface Cores 130, 132, 134, and 136 access through the Package Interconnect 125 and accelerates Galois Finite Field multiplication of two multiplicands and primitive polynomial modulus division operations used as an example means to identify Galois Finite Field multiplicative product values.

The Extended Euclidian Algorithm Dataflow Hardware Accelerator Chiplet 170 has a register-interface Cores 130, 132, 134, and 136 access through the Package Interconnect 125 and provides Extended Euclidian Algorithm acceleration that can use a processing means such as Dataflow or Coarse Grained Reconfigurable Architecture (CGRA) processing. The Extended Euclidian Algorithm provides a means to calculate Galois Finite Field multiplicative inverses necessary in decryption operations where the associated encryption process involves Galois Finite Field multiplication operations.

The Fischer-Yates Shuffle Algorithm Hardware Accelerator Chiplet 180 has a register-interface Cores 130, 132, 134, and 136 access through the Package Interconnect 125 and provides fragments both fixed-size and variable-sized mince shuffling and random bit blending hardware acceleration based on pseudorandom values supplied by a pseudorandom value generator means such as the Configurable LFSR PRV Generator Hardware Array Chiplet 150.

The Extended Euclidian Algorithm Dataflow Hardware Accelerator Chiplet 170 generally uses all components in the Galois Multiplication Hardware Accelerator Chiplet 160. Hence there is possible commercial and performance advantage in combining these two chiplets into a unified Galois Arithmetic Hardware Engine and providing the combined chiplet with an interface that supports the combined Extended Euclidian Algorithm Dataflow Hardware Accelerator Chiplet 170 and Extended Euclidian Algorithm Dataflow Hardware Accelerator Chiplet 170. Moreover, other shuffle algorithms may be used to shuffle bits, including the Fischer-Yates-Durstenfeld Shuffle and Sattolo's Shuffle Algorithms.

A multiplicity of the accelerators can be implemented in an independent application-specific integrated circuit (ASIC) or Field Programmable Gate Array (FPGA) accessible by the Processor Package 105.

Figure 2:
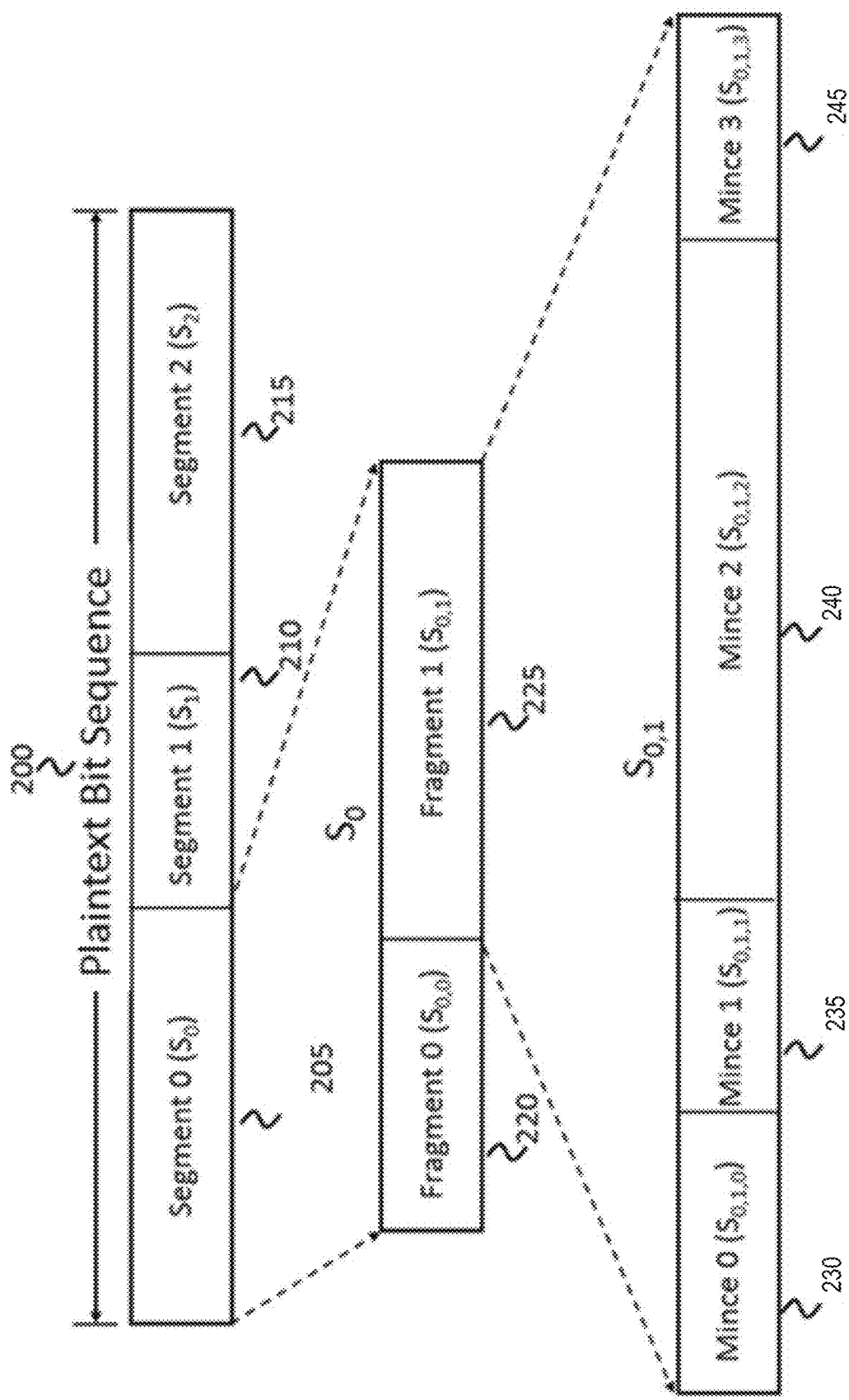
FIG. 2 depicts how a Plaintext Bit Sequence can be subdivided into a multi-level subdivision hierarchy for encryption and subsequent shuffling convenience.

FIG. 2 depicts how a Plaintext Bit Sequence 200 can be subdivided into a multi-level subdivision hierarchy for encryption and subsequent shuffling convenience. In this three-level subdivision hierarchy example using example subdivision names, a Plaintext Bit Sequence 200 comprises a multiplicity of Segments 205, 210, 215 of unequal bit-lengths, which can each be further subdivided into a multiplicity of Fragments 220, 225 of unequal bit-lengths, which can each be further subdivided into a multiplicity of Minces 230, 235, 240, 245 of unequal bit-lengths. Other example hierarchies can have additional hierarchy levels between Segments 205, 210, 215 and Fragments 220, 225. These other hierarchy levels could be named Slices, Chunks, Groups, and so on. For description clarity, the highest hierarchy level subdivisions are named Segments and the lowest hierarchy level subdivisions are named Fragments. Thus, for description clarity, encryption operations occur at the lowest level, Fragments 220, 225 in this example description.

Figure 4:
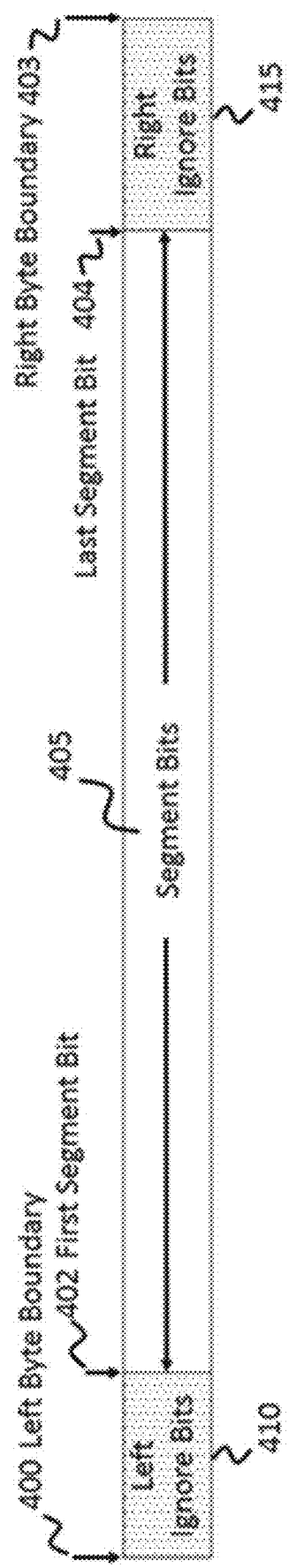
FIG. 4 illustrates an effect of dividing plaintext into segments at any arbitrary bit offset, independent of computer memory word, byte, and nibble boundaries.

Segments 205, 210, 215; Fragments 220, 225; and Minces 230, 235, 240, 245 have no arbitrary bit-length or bit-alignment restrictions (FIG. 4).

In this example, Minces 230, 235, 240, 245 are atomic encryption elements. Each contains a multiplicity of bits that are not constrained to be byte-aligned or whose number is divisible by two. Complete Fragment 220, 225 encryption may involve multiple processing passes and Mince 230, 235, 240, 245 bit-size determination may vary independently with each pass depending on PRV interpretation.

In this three-level subdivision hierarchy example, fully encrypted ciphertext Fragments 220, 225 may be reassembled out-of-order within their ciphertext Segments 205, 210, 215 and the reassembled ciphertext Segments 205, 210, 215 may be reassembled out-of-order to produce finished ciphertext.

Figure 7:
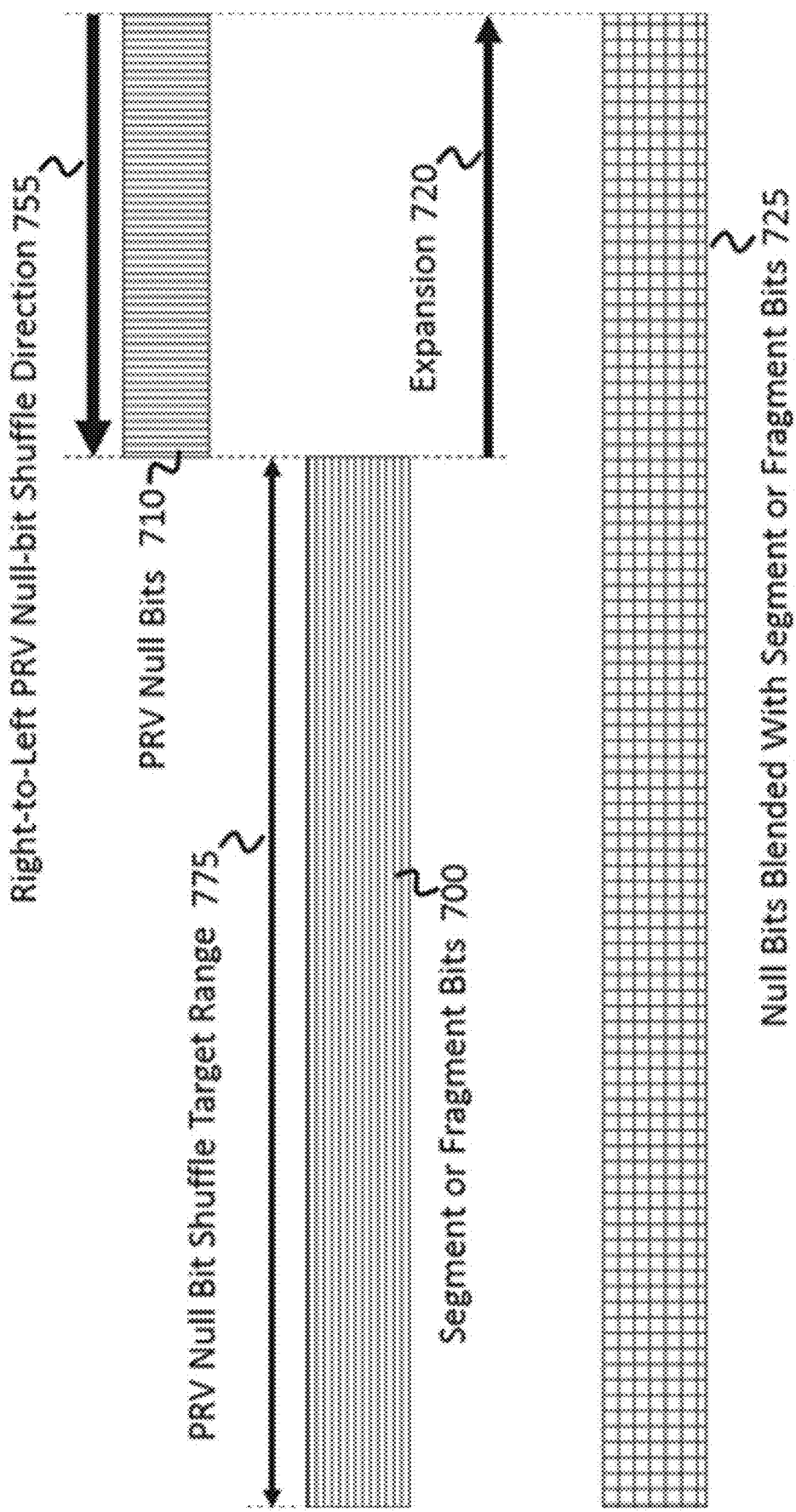
FIG. 7 illustrates how PRV Null Bits are blended into Segment or Fragment Bits.

Encrypted Segment 205, 210, 215 and encrypted Fragment 220, 225 ciphertext may have size expansion due to prepending, appending, and blending random bits into their plaintext bit sequences during the encryption process (FIG. 7). The random bits may optionally include Fragment Cyclic Redundancy Check values, Fragment Hash Values, Fragment check sums, and the like that may provide a data integrity check for Fragment decryption operations.

Fragments may have uniform bit-sizes and byte alignment, though this may potentially weaken encryption strength.

Figure 3:
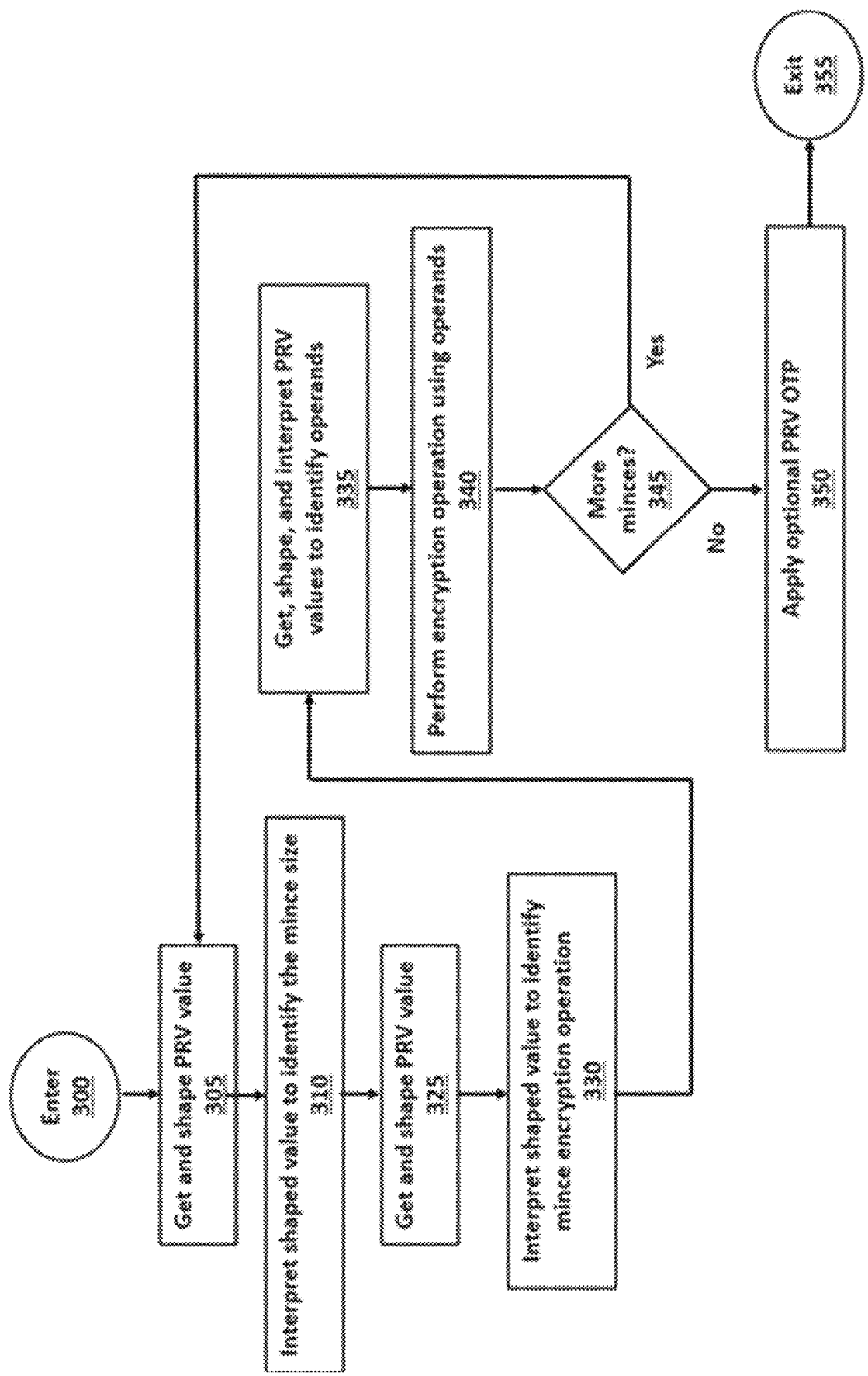
FIG. 3 depicts how minces within a single fragment are collectively encrypted to fully-encrypt the fragment in one of a multiplicity of fragment-encryption passes.
Figure 5:
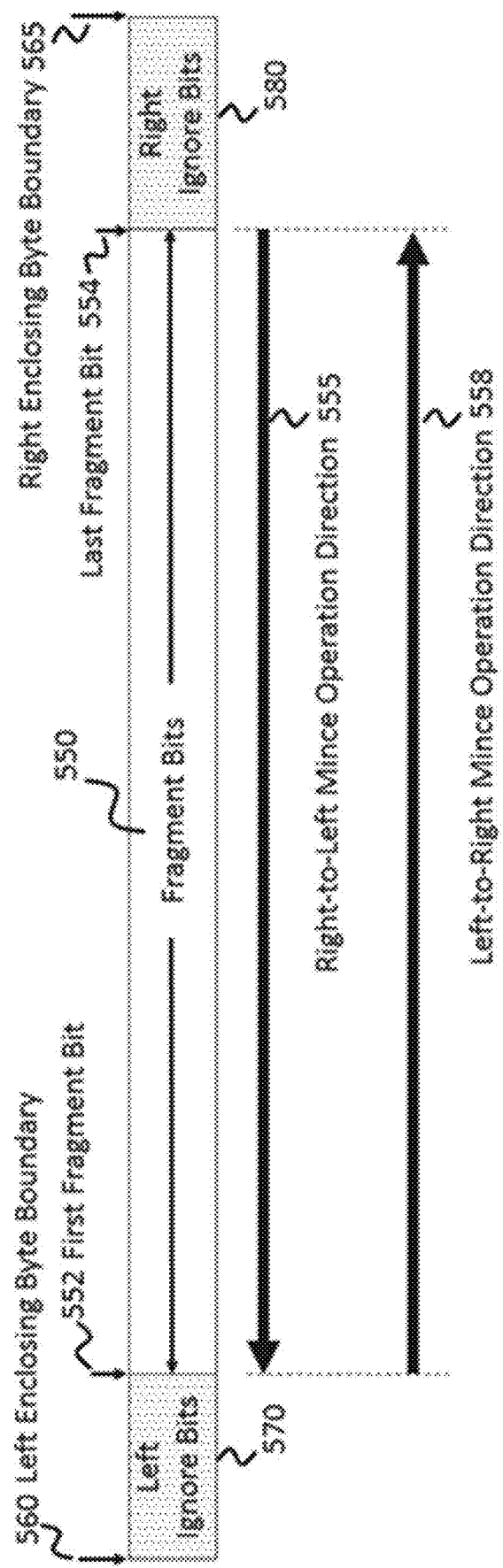
FIG. 5 illustrates an effect of dividing segments into fragments at any arbitrary bit offset, independent of computer memory word, byte, and nibble boundaries.

FIG. 3 depicts how minces within a single fragment are collectively encrypted to fully-encrypt the fragment in one of a multiplicity of fragment-encryption passes. The fragment mince encryption operation may proceed from left-to-right or right-to-left across a fragment during a fragment encryption pass depending on PRV interpretation, allowing the direction to vary independently with each fragment encryption pass (FIG. 5). A fragment encryption operation can involve multiple fragment encryption passes, depending on PRV interpretation.

The fragment encryption process begins at entry point 300.

At 305, the fragment encryption process includes obtaining and shaping a first PRV.

At 310, the fragment encryption process includes shaping a first PRV to identify the mince size.

At 325, the fragment encryption process includes obtaining and shaping a second PRV.

At 330, the fragment encryption process includes interpreting the second PRV to identify what operation may encode the mince. The operation may be a no-op encryption operation which leaves the mince value unchanged.

At 335, the fragment encryption process includes obtaining and shaping a plurality of PRVs, similarly to the PRVs of the previous steps. In one example, additional shaped PRVs may be used to encrypt the mince, resulting in more than two PRVs being obtained and shaped.

At 340, the fragment encryption process includes executing a mince operation, allowing a ciphertext mince value to replace a plaintext value in the fragment, optionally swapping positions with other fragment bit values of the same mince size whose bit values are similarly transformed.

At 345, the fragment encryption process includes determining if there may be more fragment bits to encrypt. If there are more fragment bits to encrypt, the fragment encryption process may proceed to 305 to identify a next sequentially adjacent mince to encrypt.

If there are not more fragment bits to encrypt, the fragment encryption process may proceed to 350, which includes applying an optional one-time pad (OTP) if specified by an encryption initialization. One fragment encryption pass is now complete, and the fragment encryption process may exit at 355 in order to perform additional fragment encryption passes or other fragment encryption operations.

FIG. 4 illustrates an effect of dividing plaintext into segments at any arbitrary bit offset, independent of computer memory word, byte, and nibble boundaries. Isolated Segment Bits 405 beginning with First Segment Bit 402 and ending with Last Segment Bit 404, will usually not align with a byte boundary. Thus, because computer memory bit values are generally organized into byte units, both the leftmost byte beginning at Left Byte Boundary 400 and the rightmost byte ending at the Right Byte Boundary 403 will usually contain bits from other segments. Specifically, the left-most byte beginning at Left Byte Boundary 400 will usually contain Left Ignore Bits 410 that belong to the preceding segment and not to otherwise isolated Segment Bits 405. Similarly, the right-most byte ending at Right Byte Boundary 403 will usually contain Right Ignore Bits 415 that belong to the next segment and not to the otherwise isolated Segment Bits 405. Consequently, when processing Segment Bits 405, both Left Ignore Bits 410 and Right Ignore Bits 415 may be ignored and may only be processed with their respective adjacent segments.

FIG. 5 illustrates an effect of dividing segments into fragments at any arbitrary bit offset, independent of computer memory word, byte, and nibble boundaries. Isolated Fragments Bits 550 beginning with First Fragment Bit 552 and ending with Last Fragment Bit 554, may generally not align with a byte boundary.

Thus, because computer memory bit values are generally organized into byte units, both the leftmost byte beginning at Left Enclosing Byte Boundary 560 and the rightmost byte ending at Right Enclosing Byte Boundary 565 will usually contain bits from other fragments within the same segment as Fragment Bits 550 or from different segments.

Specifically, the left-most byte beginning at Left Enclosing Byte Boundary 560 may generally contain Left Ignore Bits 570 that belong to a preceding segment or fragment and not to otherwise-isolated Fragment Bits 550. Similarly, the right-most byte ending at Right Enclosing Byte Boundary 565 may generally contain Right Ignore Bits 580 that belong to the next segment or fragment and not to the otherwise-isolated Fragment Bits 550. Consequently, when processing Fragment Bits 505, both Left Ignore Bits 570 and Right Ignore Bits 580 may be ignored and may only be processed with their respective fragments. When processing a fragment, mince identification and processing may occur a multiplicity of times, each proceeding from a Right-to-Left Mince Operation Direction 555 or from a Left-to-Right Mince Operation Direction 558. A PRV interpretation may determine the processing direction.

Figure 6:
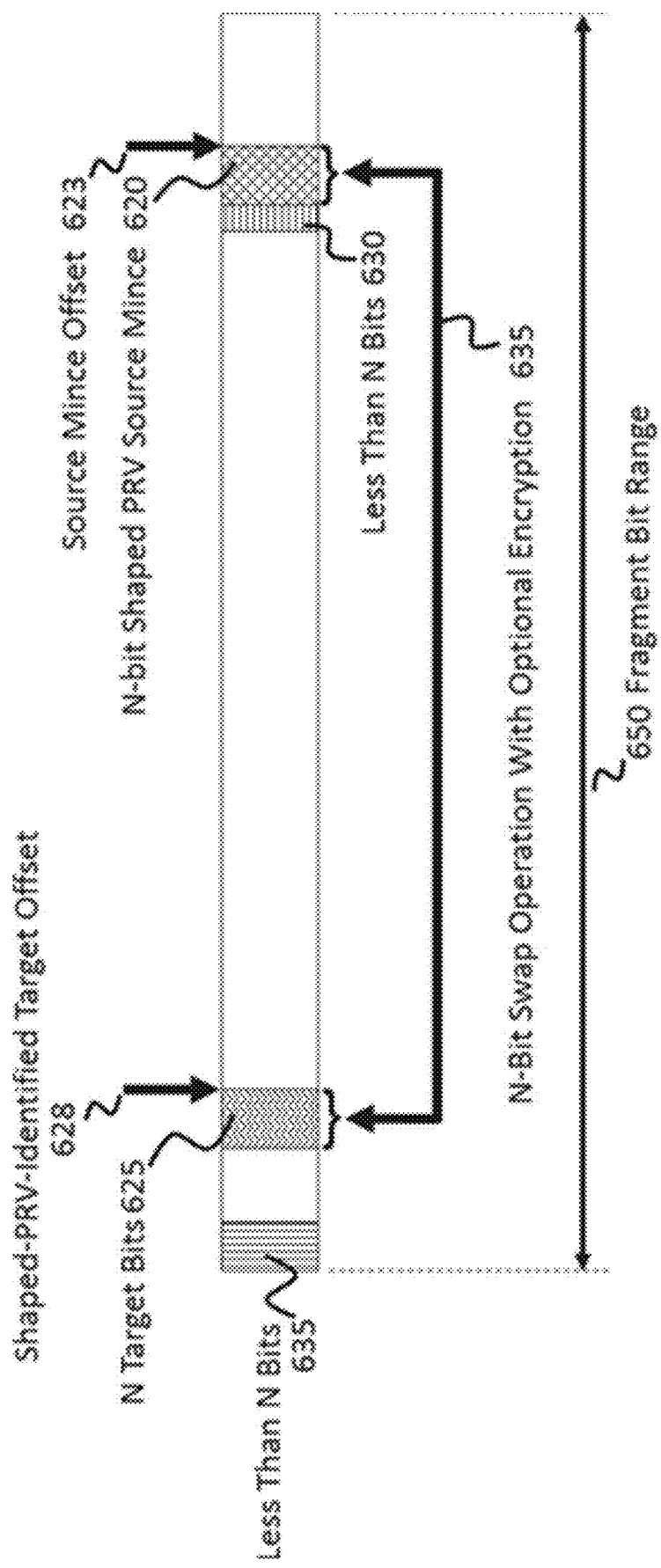
FIG. 6 depicts how ShapeShift encryption performs a fragment mince encryption positional swap operation within a Fragment Bit Range.

FIG. 6 depicts how ShapeShift encryption performs a fragment mince encryption positional swap operation within a Fragment Bit Range 650. Assuming the processing is using a Right-to-Left Mince Operation Direction 555, a mince positional swap processing pass may begin at the Last Fragment Bit 554.

Using shaped PRV interpretation, mince sizes may be independently and serially defined right-to-left in the depicted example (FIG. 6). A defined source mince may be optionally encrypted and positionally swapped/shuffled with an equal-size, encrypted source mince whose bits are to the left of the source mince before defining the next mince for processing. The next defined mince may include bits from the previously defined and encrypted mince, thereby increasing mince bit fractionation levels and increasing encryption confusion.

Swap processing continues to a new Source Mince Offset 623. In the example, the new selected bit position is past the leftmost swapped bits. The newly defined mince may contain bits from the last mince encryption operation, thereby increasing encryption effectiveness.

The size of the next N-bit Shaped PRV Source Mince 620 may be determined using shaped PRV interpretation. Another shaped PRV interpretation determines the Shaped-PRV-Identified Target Offset 628.

Note that the Shaped-PRV-Identified Target Offset 628 must be far enough away from Source Mince Offset 623 to prevent the positional swap operation from overlaying source mince and target mince bits.

Similarly, the Shaped-PRV-Identified Target Offset 628 must have a value of at least N in order to fit within the fragment. Thus, without straightforward algorithm modifications that resize mince sizes, there are two regions that the identified N-bit Shaped PRV Source Mince 620 cannot be placed into—a Less Than N-Bits 635 area and Less Than N-Bits 630 area.

Once the Shaped-PRV-Identified Target Offset 628 is identified, the N-bit Swap Operation with Optional Encryption 635 of either or both the N-bit Shaped PRV Source Mince 620 or the Target Mince 625 may occur. As indicated, encrypting either mince, or both minces, may occur when they are isolated and before they are repositioned within the Fragment Bit Range 650.

Because successive N-bit Shaped PRV Source Minces 620 associated with successive mince encryption and swapping operations 635 can positionally overlap, individual bits within an initial plaintext N-bit Shaped PRV Source Mince 620 may be swapped a plurality of times, be associated with a multiplicity of dynamically defined minces, and experience a multiplicity of heterogeneous encryption operations before being placed in ciphertext with a final value and final position.

Hardware acceleration may significantly accelerate Fragment encryption processing.

FIG. 7 illustrates how PRV Null Bits 710 are blended into Segment or Fragment Bits 700. Alternatively, the Null bits can comprise Segment or Fragment Bits 700 CRC values, Fragment hash values, Fragment checksums that allow decryption to perform data value verification.

The PRV Null Bits 710 are appended to Segment or Fragment Bits 700. Using a Right-to-Left Null-bit Shuffle direction 755, a shuffle algorithm means such as the Fischer-Yates Shuffle Algorithm successively swaps/shuffles the PRV Null Bits 710 appended to Segment or Fragment Bits 700 into the PRV Null Bit Shuffle Target Range 775 to produce Null Bits Blended with Segment or Fragment Bits 725.

The minimum number of shuffle operations necessary are the number of bits in the PRV Null Bits 710 which equals the Expansion 720 of Segment or Fragment Bits 700 to Null Bits Blended with Segment or Fragment Bits 725. A multiplicity of PRV Null Bits 710 may be simultaneously blended into the PRV Null Bit Shuffle Target Range 775 as a contiguous group.

A fragment completely consisting of PRV bit values may be shuffled into a segment. Moreover, Segment or Fragment Bits 700 may be blended into Null bits 710.

Figure 8:
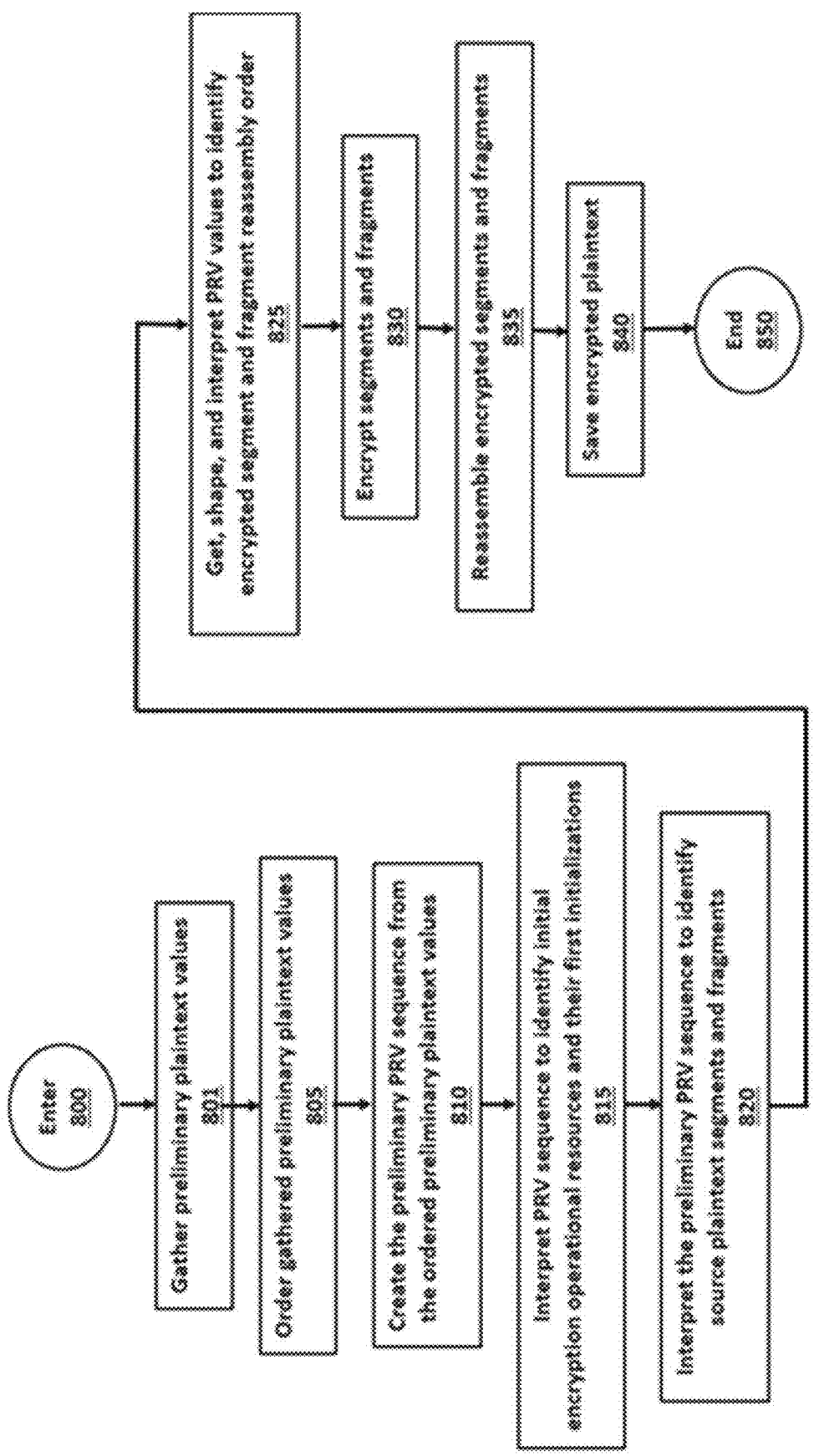
FIG. 8 depicts a method to encrypt plaintext to produce a ciphertext result that can be decrypted.

FIG. 8 depicts the steps this invention uses to encrypt plaintext to produce a ciphertext result that may be decrypted.

The process begins at entry 800.

At 801, the encryption method includes gathering preliminary persistent and immutable plaintext values.

At 805, the encryption method includes concatenating the preliminary plaintext values in an order known to the decryption means.

At 810, the encryption method includes converting the concatenated preliminary plaintext values to a preliminary PRV sequence nonce message digest value using a means, such as a specific hash method, known to the decryption means.

At 815, the encryption method includes examining and interpreting the preliminary PRV sequence nonce message digest value from 810 to identify what operational resources may be used during the encryption process, how they may be initialized, if segment or fragment expansion is allowed, and if a final OTP operation(s) may be required. The nonce values may optionally be used to construct a multiplicity of PRVGs which may produce additional nonce values the encryption method uses in addition to, or in place of, the original nonce message digest value at 810 as operational nonce values.

At 820, the encryption method includes interpreting the preliminary PRV sequence nonce message digest value at 810 to determine a segment and fragment division process and what stored values should be derived from the PRV sequence nonce message digest value at 810 for encryption activities.

At 825, the encryption method includes interpreting the operational nonce values to determine the ciphertext segment and fragment out-of-order reassembly order.

At 830, the encryption method includes encrypting the segments and fragments using stored values derived from the PRV sequence nonce message digest value at 810 and by interpreting a generated PRV sequence in a manner known to the decryption means.

At 835, the encryption method includes independently reassembling ciphertext segments and fragments in the out-of-order sequence determined at 825.

At 840, the encryption method includes saving or transmitting the out-of-order ciphertext output to Storage 120. The method may complete and terminate at 850.

Figure 9:
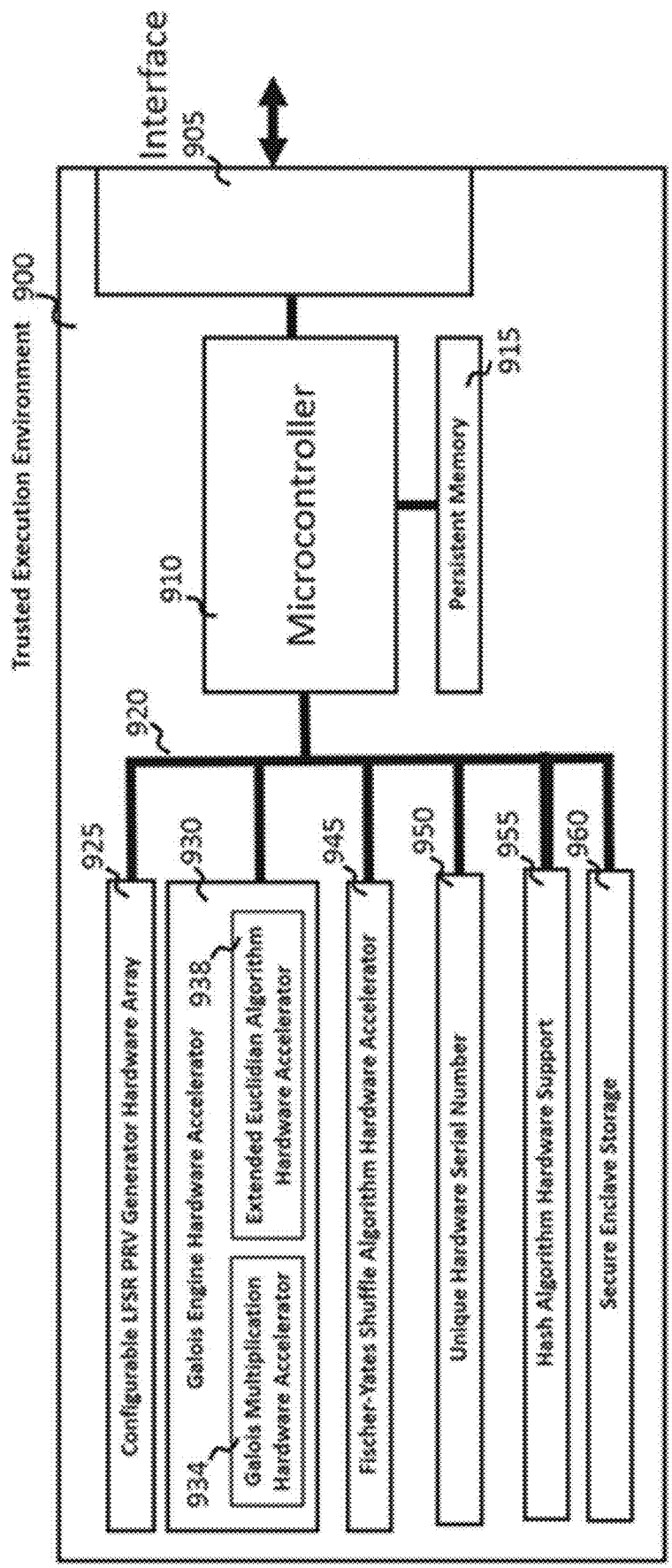
FIG. 9 depicts an example computational storage hardware device with a Trusted Execution Environment embodiment of the present invention as comprising a multiplicity of components mounted on a standard printed circuit board (PCB).

FIG. 9 depicts an example computational storage hardware device with a Trusted Execution Environment 900 embodiment of the present invention as comprising a multiplicity of components mounted on a standard printed circuit board (PCB).

The Trusted Execution Environment 900 has an Interface 905 such as a USB, PCIe, Ethernet, SMBus, I2C, etc. interface that enables it to connect to another system. The Trusted Execution Environment 900 requires power to function. FIG. 9 assumes this required power is available through the Interface 905 connection. Otherwise power is supplied through a means not depicted, but well known to those skilled in the art.

Trusted Execution Environment 900 contains a Microcontroller 910 that can attach to an optional Persistent Memory 915 for persistent data storage means. The Microcontroller also attaches to an internal connection 920 means that enables it to communicate with a multiplicity of hardware acceleration circuits which can be individual circuits or a multiplicity of them integrated into a multiplicity of circuits.

These circuits may include a Configurable LFSR PRV Generator Hardware Array 925; a Galois Engine Hardware Accelerator 930 which may include a Galois Multiplication Hardware Accelerator 934 and an Extended Euclidian Algorithm Hardware Accelerator 938; A Fischer-Yates Shuffle Algorithm Hardware Accelerator 945; a Unique Hardware Serial Number 950 retention means for the Trusted Execution Environment 900 which may be available to use as a hashing salt; a Hash Algorithm Hardware Support 955 means, and a tamper-resistant Secure Enclave Storage 960 means.

A multiplicity of the circuits depicted in FIG. 9 may be integrated into an embodiment implementation using a System On Chip (SOC), an ASIC, as well as FPGA hardware logic.

Figure 10:
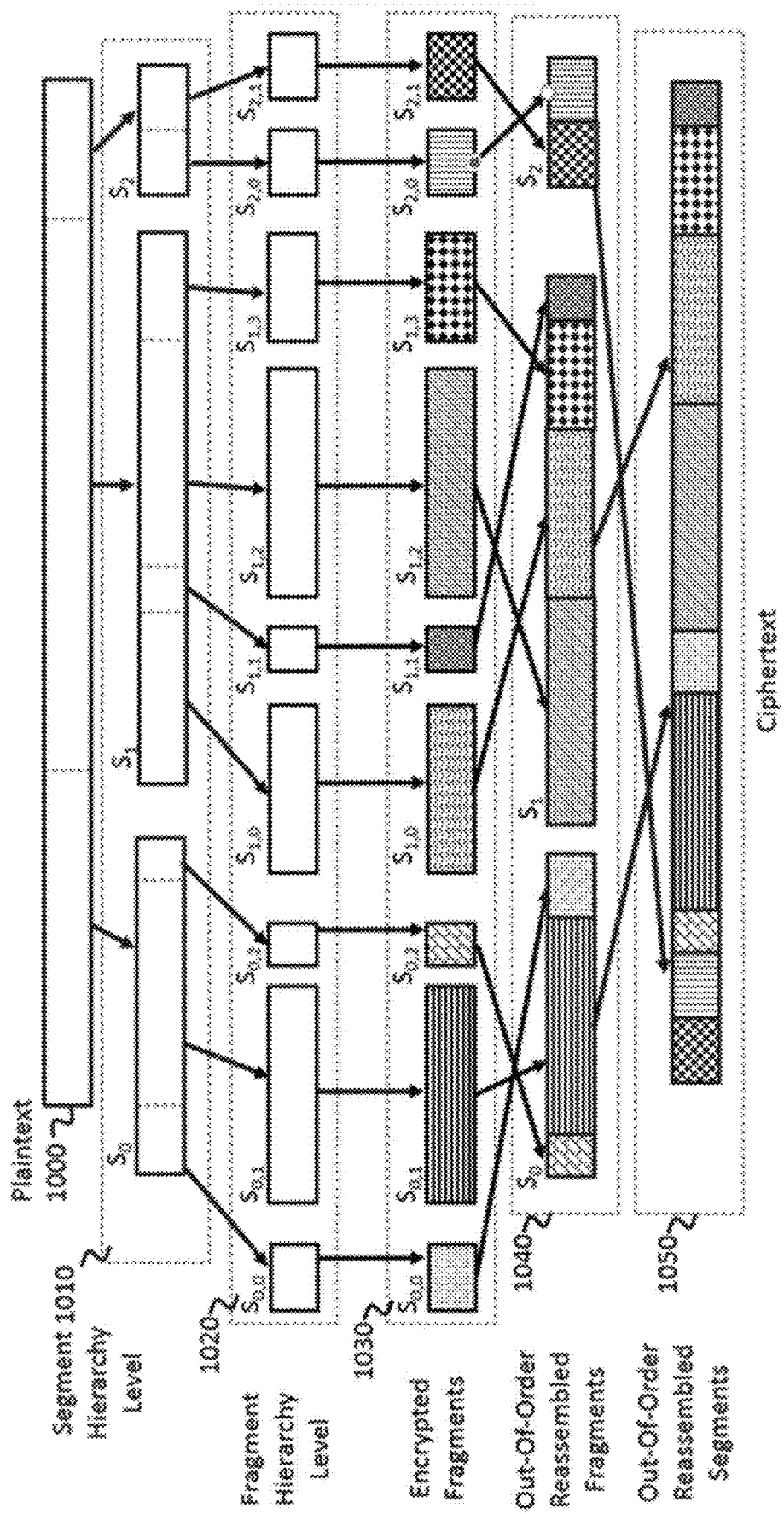
FIG. 10 depicts a simplified three-level hierarchy that is created during a ShapeShift plaintext encryption procedure.

FIG. 10 depicts a simplified three-level hierarchy that is created during a ShapeShift plaintext encryption procedure. Plaintext 1000 is first divided into segments under PRV interpretation control which creates the Segment Hierarchy Level 1010. In FIG. 10, three unequal-size segments are created, represented as $S_0$, $S_1$, and $S_2$.

Segments $S_0$, $S_1$, and $S_3$ are then individually subdivided into Fragments under PRV interpretation control, creating the Fragment Hierarchy Level 1020. Looking at FIG. 10, $S_0$ is subdivided into three unequal-size Fragments designated $S_{0,0}$, $S_{0,1}$, and $S_{0,2}$. Similarly, $S_1$ is subdivided into four unequal-size Fragments designated $S_{1,0}$, $S_{1,1}$, $S_{1,2}$, and $S_{1,3}$. Similarly, $S_2$ is subdivided into two unequal-size Fragments designated $S_{2,0}$, and $S_{2,1}$.

Individual fragments now are encrypted under PRV interpretation control, creating Encrypted Fragments 1030. Encrypted fragments associated with each Segment are reassembled out-of-order under PRV interpretation control into Out-of-Order Reassembled Fragments 1040 to produce associated encrypted segments. The encrypted Segments may be reassembled out-of-order under PRV interpretation control to produce the Out-of-Order Reassembled Segments 1050 which is the desired Ciphertext. Subsequent decryption procedures may reverse each of the procedures correctly in reverse order to recover the original Plaintext.

The Out-of-Order Reassembled Segments 1050 ciphertext generally has a beginning of an encrypted Fragment within the beginning of an encrypted segment at the start of the ciphertext. Moreover, the Out-of-Order Reassembled Segments 1050 ciphertext generally has the end of an encrypted Fragment within the ending encrypted segment at the start of the ciphertext.

Figure 11:
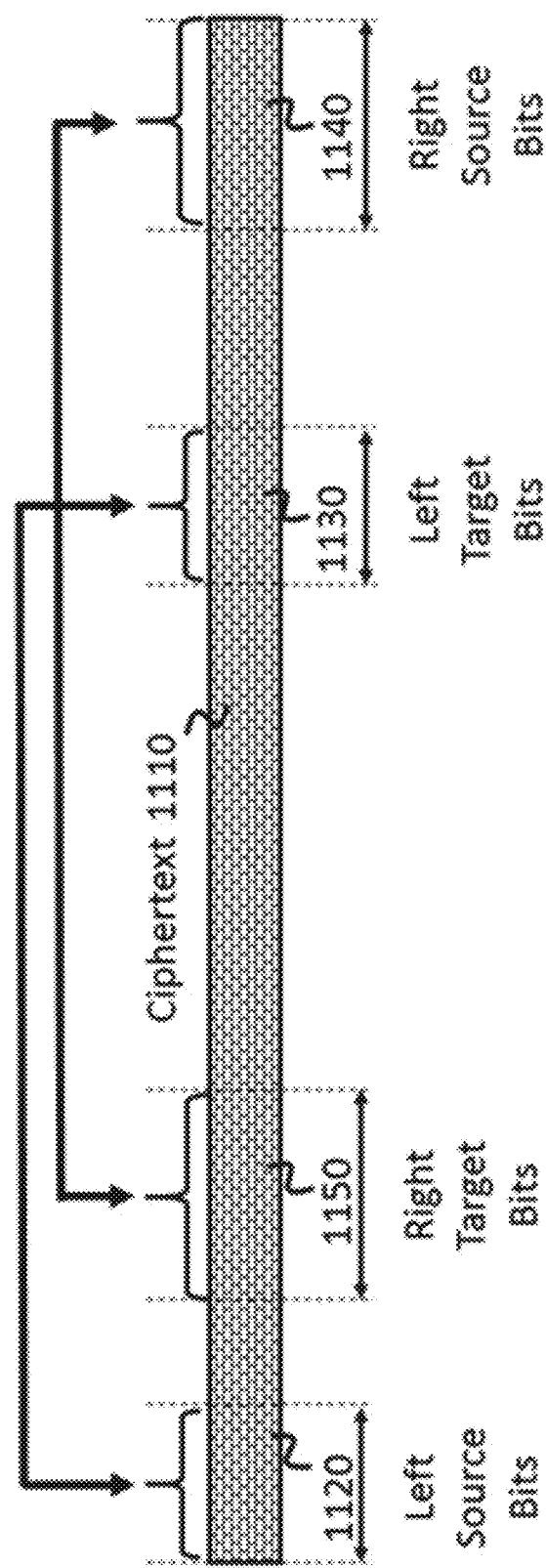
FIG. 11 depicts a Ciphertext wrapping technique that increases ciphertext confusion.

FIG. 11 depicts a Ciphertext 1110 wrapping technique that increases ciphertext confusion. As FIG. 10 indicates, the left (high-order) side of ShapeShift encrypted Ciphertext generally begins with an encrypted fragment within an encrypted segment. Moreover, the right (low-order) side of ShapeShift encrypted Ciphertext generally ends with an encrypted fragment within an encrypted segment. This adds predictability that assists unauthorized decryption attempts. A solution means to this undesirable predictability is to swap low-order and high-order Ciphertext bits with other Ciphertext bits.

In FIG. 11, Left Source Bits 1120 swap positions with Left Target Bits 1130 under PRV interpretation control. Similarly, Right Source Bits 1140 swap positions with Left Target Bits 1150 under PRV interpretation control. The number of bits selected and the target bit offsets may be determined by PRV interpretation control. These swaps may eliminate undesirable encrypted Fragment start and end predictability.

Digital data security is very important to private persons and enterprises. Consequently, data security methods that effectively and efficiently protect data have significant global commercial value.

Because increasing unauthorized private and enterprise system accesses covertly copy and exfiltrate confidential data, data encryption is an increasingly important data security protection element. Though no data encryption prevents unauthorized system accesses, encrypting valuable data significantly impedes its usefulness to intruders who copy, but cannot decrypt or exploit, encrypted data. Thus, data encryption methods have significant global commercial value as an important global data protection element.

This invention performs a preliminary data collection phase to aggregate persistent, immutable, or otherwise reconstructible data from a multiplicity of sources. Some of this data may be used, and therefore exposed, as part of the ciphertext file name, included with the encrypted data, as output plaintext header, or exist as accessible metadata using other persistent, immutable retention means.

A variously selected, an initial Pseudo Random Value (PRV) generating resource, such as a hashing operation, processes the aggregated data associated with an encryption and subsequent decryption process to produce an initial binary PRV bit sequence. The encryption method variously interprets produced the PRV bit sequence as a multiplicity of token values that define the global encryption process strategy that includes plaintext segment and fragment identification procedures; selecting an operational PRV generation method, its initial configuration, and its initialization; define encrypted-output size expansion considerations; identify authorized PRV Null bit stuffing strategies; define operating tables, number of table elements, and element values; and define final encrypted output assembly strategy. PRV interpretation also provides a multiplicity of PRV values used by intermediate operations such as segment One Time Pad (OTP) encryptions. The specific order PRVs are used significantly affects the final cipher text result.

In an alternative embodiment, token value interpretation allows an encryption server means to enable a PRV stream to define an encryption methodology that a remote encryption client can follow, discard, modify, or otherwise augment, providing an encryption client the capability of denying encryption server means the capability of decrypting encrypted data.

For example, an encryption server can provide a token sequence to an encryption client that defines a multiplicity of atomic encryption transform methods that each comprise a multiplicity of atomic encryption phases such as plaintext preconditioning phases, encryption transform phases, and postconditioning phases. These atomic encryption transform methods a server provides can be in addition to atomic encryption transform methods the client previously or subsequently performs independent of the server suggested operations. Other tokens can identify the number of encryption passes a fragment experiences as well as a maximum plaintext to ciphertext expansion factor and how it is generated, possibly by blending pseudo random or true random bits into the plaintext, intermediate ciphertext, or final ciphertext.

A multiplicity of initialized, operational PRVGs produce the multiplicity of on-demand PRV values the encryption method needs and independently determines when to reconfigure itself and reinitialize the new configuration with an optional initialization jitter. Under PRV interpretation, a given PRVG can be abandoned and replaced by another, completely independent PRVG that has a completely different architecture.

The encryption process interprets produced operational shaped PRV values to identify plaintext input segments, fragments, and fragment minces; individual mince and group mince encryption operations; mince encryption operation parameters; as well as encrypted fragment and segment reassembly order strategy.

When an initial encryption framework is reconstructed, as one means, subsequent decryption operations can use push/pop stack logic to reverse encryption operations operation-by-operation under deterministic PRV interpretation. Successful decryption requires knowing the multiplicity of considerations known to, and used by, the encryption process. Not knowing any one of them, or using them in the incorrect order, can seriously impede unauthorized decryption attacks.

The encryption approach allows encryption operations to trade off CPU processing performance requirements, encrypted output size, and encryption strength by not having nibble data alignment or size requirements, Null value blending, and out-of-order encrypted hierarchal subdivision reassembly. Integrating a multiplicity of Linear Feedback Shift Registers (LFSRs) generators to construct a PRVG enables utilizing the approach in applications where multitenant or public sharing may compromise data security.

In storage device deployments, storage devices can provide an I/O Application Programming Interface (API) extension similar to the multi-stream I/O interface Samsung Electronics Co., Inc. proposed for, and incorporated within, its NAND Flash Solid State Drives (SSDs). However, for this invention, rather than passing a multi-stream ID only on write requests, write requests pass additional encryption information to the storage device with both write and read data requests. The storage device uses the additional encryption information to dynamically encrypt the associated write data before placing the encrypted write data on storage media.

Subsequent read requests would similarly include additional encryption information with read requests. The storage device would use the additional encryption information to dynamically decrypt the data retrieved from the media before returning the decrypted result as requested read data. If a read request fails to pass the same additional encryption information the device used to encrypt the original write data, the request successfully can complete without indicating an operational error, though the read request only returns invalid data.

It is important to note that NVMe Storage devices, in their many form factors, support a multiplicity of Namespaces as well as Admin, Submission, and Completion Queues. On write requests, a self-encrypting NVMe storage device could use the specific Namespace and Submission Queue ID processing the request, as well as the additional encryption information, such as file metadata, to encrypt plaintext data. In this instance, subsequent accesses are only successful if additional encryption information is provided on subsequent read requests through the correct, previously associated Namespace and Submission Queue. An individual I/O stream could intermittently change Write Submission Queues to increase confusion for unauthorized access attempts.

In another NVMe invention embodiment, plaintext data residing on NVMe storage media could be subsequently encrypted by passing Logical Block Address (LBA) information to the NVMe encryption means through a Submission or Admin Queue with a command to encrypt the identified LBA plaintext data. This allows the encryption means to access media indirection address translation tables that map LBA values into physical media locations of data at rest. This approach can be used with other storage devices by passing the LBA information through device interfaces using non read-write administrative commands.

This invention provides a novel, flexible data encryption method that allows data administrators and data protectors to trade encryption strength, output encrypted data size expansion, and required CPU processing levels when performing encryption operations. Its scalable flexibility naturally supports a wide variety of data encryption needs efficiently and effectively.

For example, publicly shared, multi-tenant data centers, often referred to as cloud data centers, typically have significant CPU processing and data storage capacities that can provide strong data encryption support. They also have equally significant data storage and transmission encryption strength requirements because of their public accessibility, shared storage, shared storage class memory resources, and immense quantities of data both at rest and in transit over communication media.

In contrast, existing and future Internet of Things (IOT) and Edge Computing devices typically possess modest data encryption resources and capabilities that often result in reduced, lightweight encryption strength for data storage and data transmissions.

Because enterprises often need to support a wide encryption-strength range, it is commercially valuable for a single data encryption methodology to provide a scalable encryption strength that supports many data encryption requirements, as this invention does.

Importantly, this invention has no vulnerability to large prime number factoring decryption attacks, including Peter Shor's 1994 algorithm executing on predicted Quantum Computers. Such attacks threaten to eliminate the present effectiveness of many existing data encryption methods, including the effectiveness of the ubiquitous RSA public key exchange method. Because this invention does not utilize large number factoring considerations, the invention effectively neutralizes Quantum Computing's strength when combined with Peter Shor's 1994 algorithm. Moreover, it can be combined within existing RSA infrastructures to provide industrial-strength data encryption means.

In addition, this invention also has significantly reduced vulnerability to cache timing and side channel attacks because of the transitory nature of the operational PRVGs and PRV encryption values involved, and the ease with which operations and critical values can be obfuscated.

Because this invention has no large prime number factoring vulnerability, it can effectively neutralize Quantum Computing's capability to factor large numbers and supersede encryption methods that do, including the aforementioned RSA public key exchange method. Therefore, this novel invention has significant commercial value.

This invention circumvents large prime number vulnerabilities by not using conventional key-based encryption methods that involve constructing encryption keys involving large prime number calculations. It is therefore plausible to assert this invention provides a keyless encryption means that has the aforementioned reduced-vulnerability to cache timing and side channel attacks and encryption strength due to the number and scope of operational and configuration vectors that must be captured, interpreted, and synchronized correctly.

Instead of keys, this invention's encryption operations are dynamically selected by, and interpreted by shaped PRV sequence values conformant to a multiplicity of transitory, externally opaque considerations. Such considerations might include the encryption program version, encryption date and time of day, pseudo randomly selected data of pseudo random length retrieved at pseudo randomly selected offsets within pseudo randomly selected files that are intermittently accessible, secure enclave data, security key dongle data, biometric data, keyboard prompt response input, code book contents, and so on.

Thus, encrypting a given plaintext with two different encryption program versions or at different times can produce two very different encrypted outputs. In addition, copying a plaintext file to a different file and encrypting both files can result in two different ciphertexts. Moreover, encrypting plaintext using a given encryption version with additional, easy-to-incorporate measures provided by a PRV token server can produce yet other results.

Using deterministic PRV sequence interpretations are important for subsequent decryption operations since it enables authorized decryption operations to recreate identical encryption PRV sequences when the multiplicity of all initializing, interpretation, and operating conditions are correctly attendant, applied, in the correct way, and in the correct order. Deterministic PRV sequence interpretations allow authorized decryption processes to identify precise encryption operation steps, reverse them, and correctly decrypt the encrypted data to recover all original plaintext. Usually, the interpreted PRVs are not visible in the final ciphertext, only their opaque effect is.

This invention teaches it is also possible to utilize non-reconstructible, true random number values during encryption procedures. These non-reconstructible, true random number values would not normally be available or otherwise reconstructible. If the true random number values are not available or otherwise reconstructible by subsequent decryption operations, their use is only permitted when optionally prepending, appending onto, or blending them in as meaningless random Null values into encrypted data under deterministic PRV interpretation, thereby increasing encryption confusion at the expense of additional operations and increased ciphertext size.

If true random or PRV values are directly visible in encrypted data, they are usually indistinguishable from encrypted plaintext data values. Decryption operations algorithmically ignore prepended, appended, and blended random values when decryption PRV sequence interpretations identify their locations and contiguous bit-lengths. Encryption can also use PRV-generated values to achieve similar obfuscation and confusion. Alternatively, blended PRV values can be constant values, Error Correction Codes (ECCs), Cyclic Redundancy Checks (CRCs), checksum values, etc. of the associated plaintext or intermediate ciphertext bits.

There are many well-known methods used in the art to generate PRV sequences. These various methods exhibit varying output randomness qualities. For example, the well-known, but cryptographically vulnerable, Secure Hash Algorithm 1 (SHA-1) is a cryptographic hash function which uses an arbitrary-length plaintext input to produce a 160-bit (20-byte) hash value. Secure Hash Algorithm 3 (SHA-3) is another cryptographic hash function with stronger randomness qualities.

There are numerous random value generators known to software practitioners. Melissa O'Neill at the Harvey Mudd College's Computer Science Department has developed the Permuted Congruential Generator (PCG) random number generation approach, which is a family of simple, fast, space-efficient statistically good algorithms for generating random numbers. Other examples are the publicly available random number generation facilities that produce use combinations of generators and distributions available to C++ programs when including the <random> header file in application programs. It is possible to construct powerful PRVGs by integrating a multiplicity of such random value generators into a single PRVG.

From a hardware accelerator perspective, Galois Linear Feedback Shift Registers (LFSRs) (also known as modular, internal XORs, or one-to-many LFSRs) can also produce PVR sequences, one bit-at-a time. It is well known that it is possible to implement Galois LFSRs in software or in hardware, providing a tradeoff between performance and hardware cost. It is also possible to interconnect a multiplicity of LFSRs together, as well as registers in a single or multiple LFSRs, to create a non-linear PRV generator.

Galois LFSR practitioners skilled in the art appreciate that software Galois LFSRs are compact, easy to initialize, operationally efficient, and that it is easy to apply characteristic polynomial feedback. Their output feedback bit values are also well suited for PRV generation when the characteristic feedback polynomial is carefully chosen.

Concatenating eight successive Galois LFSR-produced feedback bits in their deterministically generated order produces a deterministic, subsequently reconstructible 8-bit data byte sequence. This is a consequence of LFSR operations themselves being deterministic. Thus, when two independent LFSRs have the same number of state registers, initial values, and use the same characteristic feedback polynomial, identical, deterministic bit sequence outputs occur.

Because of this LFSR bit-sequence output determinism, it is possible to produce subsequently reconstructible 8-bit data bytes when an encryption and subsequent decryption operation both use an identical LFSR configuration and, optionally, the same algorithm to discard algorithmically identified LFSR output bits. The same is true for other PRVG means.

Practitioners skilled in the art appreciate that Galois LFSRs produce maximum-length, non-repeating PRV bit sequences when the characteristic feedback polynomial is a Galois Field primitive polynomial for the LFSR configuration. If a LFSR holds state using M bit-registers (state registers) and uses an associated degree M primitive polynomial as the characteristic feedback polynomial, the LFSR will produce a sequence of $2^M-1$ bit values before repeating the produced bit sequence.

Thus, using a LFSR with more internal registers with an associated primitive polynomial as a characteristic feedback polynomial may provide a longer non-repeating PRV sequence. If a LFSR's characteristic feedback polynomial frequently changes, it may not be required to generate maximum-length PRV output streams. In fact, it is highly likely that any odd feedback polynomial value will suffice as a LFSR characteristic feedback polynomial without having to test for a LFSR all-zero state.

This invention teaches that dynamically Shapeshifting a LFSR PRV generating resource based on PRV interpretations has significant value because deterministic LFSR output PRV sequence values are less predictable when the LFSR primitive polynomial opaquely changes.

This is important when attempting to reduce the probability for successful unauthorized decryption attacks because a deterministic LFSR output PRV sequence becomes increasingly predictable when LFSR output is visible. Opaquely transitioning to another, unrelated deterministic LFSR output sequence seamlessly interrupts an existing PRV output sequence. This transition introduces output sequence discontinuities that can defeat bit sequence output prediction attempts. The same is true for other PRVG means.

For example, a 24-bit software LFSR may be using the $24^{th}$ order characteristic primitive polynomial associated with the hexadecimal value 0x1028E37. This polynomial provides a deterministic $2^{24}-1$ non-repeating bit sequence before the output bit sequence begins repeating and continues to reappear every $2^{24}-1$ bit outputs.

However, opaque software programming may dynamically reconfigure the LFSR to use one of the other 276,480 $24^{th}$ order primitive polynomials (Table 1) such as the polynomial associated with the hexadecimal value 0x1FCEE4B, 0x13BD28F, or 0x17DB739 as three of the other 276,479 $24^{th}$ order primitive polynomial candidates.

Alternately, the software may change the number of LFSR state registers, requiring the software to use an entirely different set of primitive polynomials, each associated with the correct polynomial order. It may also opaquely select a new initialization value and exercise the LFSR a multiplicity of times that varies with each transition, introducing an opaque operational output jitter. It may also use a different PRV-determined, LFSR output-bit discard algorithm.

Software programming may also use a jitter factor to algorithmically discard output bit values in normal operations. All such transitions and discontinuities occur under deterministic PRV interpretation, allowing decryption operations to identify and reverse them when recovering original plaintext during decryption operations.

This invention teaches that it is valuable to have a PRVG resource method that can operate autonomously, has opaque operations, and is self-configurable via PRV output interpretation. Such a PRVG resource can be considered encapsulated from the encryption and decryption logic. To this end, these example Shapeshifting LFSR transitions each introduce abrupt, LFSR bit output discontinuities. These interrupted bit sequence output discontinuities individually present significantly impediments for attempts to predict PRV output based on previous observed output if a given LFSR operating state is somehow temporarily deduced. This is useful because these discontinuities reduce the probability that attackers can decrypt encrypted data if they are able to deduce some, or all, PRV sequence values.

Encryption and decryption software modules that receive 8-bit PRV values can remain unaware of the encapsulated, opaque Shapeshifting LFSR transitions because they continuously receive seamlessly uninterrupted, assembled, 8-bit PRV values. LFSR operating independence also allows software LFSR execution on a separate processing core from encryption and decryption processing threads, thereby potentially allowing multi-core processing throughput to exceed single core encryption processing throughput.

In multicore and multiprocessing environments, a PRVG thread could have a different core or processor processing affinity to accelerate system throughput. LFSR processing could also occur on a multiplicity of heterogeneous architecture processors with respect to a multiplicity of processors receiving LFSR PVR output to perform encryption and decryption activities.

Practitioners skilled in the art appreciate the number of available $GF(2^n)$ primitive polynomials vary by the value of the exponent $n$. For example, there are 16 primitive polynomials when n=8; 2,048 primitive polynomials when n=16; 276,480 primitive polynomials when n=24; and 67,108,864 primitive polynomials when n=32. Table 1 provides the number of primitive polynomials for each value of the exponent n, where n ranges from 3 to 24. The https://oeis.org/A011260 Web page lists the number of primitive polynomials over GF(2n) for other values of n.

TABLE 1

| Exponent $n$ | Number of GF($2^n$) Primitive Polynomials |
|---|---|
| 3 | 2 |
| 4 | 2 |
| 5 | 6 |
| 6 | 6 |
| 7 | 18 |
| 8 | 16 |
| 9 | 48 |
| 10 | 60 |
| 11 | 176 |
| 12 | 144 |
| 13 | 630 |
| 14 | 756 |
| 15 | 1800 |
| 16 | 2048 |
| 17 | 7710 |
| 18 | 7776 |
| 19 | 27594 |
| 20 | 24000 |
| 21 | 84672 |
| 22 | 120032 |
| 23 | 356960 |
| 24 | 276480 |

Frequently changing a LFSR's characteristic polynomial and internal register state has negligible performance impact. Thus, it can be useful for a software LFSR implementation to have access to several, or all, associated LFSR primitive feedback polynomials. This can facilitate frequent, unpredictable characteristic polynomial transitions under PRV interpretation with minimum characteristic polynomial reuse probability.

For example, software may be using a LFSR with 24 state registers. From Table 1, there are 276,480 available primitive polynomials. Assuming each polynomial occupies four system memory bytes, storing all the polynomials requires (276480×4) bytes, or 1,105,920 bytes total. When systems do not have the ability to reserve this memory for all 24-bit polynomials, the required amount may be reduced by 50 percent by identifying the reciprocal primitive polynomial pairs that observe the following relationship:

$$P^*(x) = x^n P(1/x) \qquad \text{(Equation 1)}$$

When Equation 1 is true, the two primitive polynomials $P^*(x)$ and $P(x)$ are reciprocal primitive polynomials.

When all 138,240 $24^{th}$ order reciprocal primitive polynomial pairs are identified for 24-bit LFSRs, storing one primitive polynomial from each reciprocal pair in memory requires 552,960 bytes. Software and hardware acceleration logic can reconstruct the other polynomial not stored in memory using Equation 1 when needed.

Alternately, software can elect to choose a reciprocal primitive polynomial from a subset or bounded range of all primitive polynomial pairs. This facilitates using 32-bit LFSRs that benefit from using one of the 67,108,864 primitive polynomials that collectively require 268,435,456 bytes to store in memory. The selected polynomial subset and number of polynomials can vary by time of day, program version, etc.

When LFSR operations commence after configuring the initial LFSR, subsequent LFSR output interpretations can define the next LFSR ShapeShift transition to other LFSR sizes, characteristic polynomials, register state initializations, bit output discard algorithms, and jitter values.

Practitioners skilled in the art appreciate that transitioning to a LFSR with a different number of state registers requires repeating the aforementioned initialization process for the new LFSR size. This is because the new, different size LFSR will require characteristic polynomials of a different order with a different number of significant bits. The new polynomial order consequently has a completely different set of primitive polynomials.

Lower-order primitive polynomials associated with smaller Galois Finite Fields may require even less memory space to store than four bytes per polynomial. For example, storing a primitive polynomial associated with 8 or fewer bits in memory requires only one byte each. Similarly, storing a primitive polynomial with 9 to 16 bits in memory only requires two bytes.

Smaller Galois Finite Fields usually have fewer primitive polynomials, each with lower order, therefore having fewer associated description bits. So, using LFSRs with fewer state registers can significantly reduce memory requirements to store associated LFSR characteristic primitive polynomials. However, this benefit is achieved at the expense of reduced non-repeating bit sequence lengths, though that may not be a problem when the characteristic feedback polynomial frequently changes.

For generally optimal security, a Pseudo Random Value Generator resource should be obfuscated or otherwise unobservable by unauthorized logic. This can be achieved by dispersing operational Pseudo Random Value Generator resource elements across a large memory space and obfuscating their value or state when they are not actively participating in Pseudo Random Value Generator activities.

Another example way to prevent unauthorized observation of Pseudo Random Value Generator resource activities is to use a sequestration approach. Placing a Pseudo Random Value Generator resource in a forthcoming Arm Confidential Compute Architecture (CCA) Realm can significantly impede or preclude such unauthorized observations. Another approach is to perform encryption and decryption activities using a commercially-available Data Processing Unit (DPU). This processing offloading method can provide host systems cryptographic acceleration while simultaneously isolating the operations from a host system's control and management processing plane scrutiny.

This invention selects operations and operational values within varying contexts that are derived by shaping PRV values to conform to contextual needs. One type shaping derivation enforces a maximum ceiling value. For example, an operational value may inclusively range between 0 and a maximum ceiling value of 32.

In general, if a PRV generator resource produces unsigned 8-bit PRV values that range from 0 to 255, an example operational shaped value construction is:

$$(\text{PRV}) \text{ modulus } 32 + 1 \qquad \text{(Equation 2)}$$

Simplified:

$$(\text{PRV}) \text{ modulus } 33 \qquad \text{(Equation 3)}$$

Here, the (PRV) modulus 33 operation in Equation 3 derives the desired shaped number range {0, 1, 2, ..., 32}.

Another shaping derivation enforces a minimum floor value and a maximum ceiling value. For example, an operational value may inclusively range between a minimum floor value of 9 and a maximum ceiling value of 53. If a PRV generator resource produces unsigned 8-bit values that range from 0 to 255, an example operational shaped value construction is:

$$[(\text{PRV}) \text{ modulus}(53-9+1)] + 9 \qquad \text{(Equation 4)}$$

Simplified:

$$[(PRV) \text{ modulus } 45]+9 \quad \text{(Equation 5)}$$

Here, the (PRV modulus 45) operation in Equation 5 produces the values {0, 1, 2, . . . , 44}. Adding 9 to each of these values derives the desired shaped number range {9, 10, 11, . . . , 53}.

Similarly, as another example, an operational value may be a 29-bit value and a PRV generator resource may produce unsigned 8-bit values. An example operational shaped value derivation is:

$$((PRV_1 <<24) \oplus (PRV_2 <<16) \oplus (PRV_3 <<8) \oplus (PRV_4)) \: \& \: \text{0x10FFFFFF} \quad \text{(Equation 6)}$$

In Equation 6, $PRV_1$, $PRV_2$, $PRV_3$, and $PRV_4$ are sequentially-produced, 8-bit PRV values, <<n is a logical left shift operation of n bits, $\oplus$ is the Boolean XOR operation, and & is the Boolean AND operator.

It follows that an encryption operation can use a multiplicity of sequentially produced PRV values of arbitrary bit-size and shape them to derive values fulfilling contextual operational requirements.

Practitioners skilled in the art will appreciate these shaping-example methods reduce biases that degrade randomization quality and that the spirit and scope of this invention encompasses alternative approaches that similarly reduce these biases.

This invention teaches that a derived sequence of bit values representing digital plaintext may be a compressed version of originally uncompressed plaintext. Henceforth, in this invention discussion, the term plaintext is meant to include original plaintext and any compressed representation of the original plaintext that may be generated before encryption operations begin or during encryption operations.

Plaintext can be viewed as a continuous, horizontal sequence of 0-bits and 1-bits. In this discussion, the bit occupying the highest-order position is considered the left-most bit and the bit occupying the lowest-order position is considered the right-most bit. A Left-To-Right (LTR) direction proceeds away from the left-most bit and towards the right-most bit. A Right-To-Left (RTL) direction proceeds away from the right-most bit and towards the left-most bit.

Individual plaintext bit values and their location within their sequence define the plaintext within its encoding or compressed encoding context. From a Shapeshift encryption strength perspective, there can be advantage to disregarding arbitrary nibble (4-bit), byte (8-bit), or word (16-bit or 32-bit) boundaries within a digital plaintext bit sequences and view plaintext as a bit sequence that can be freely subdivided and processed as desired. Here, the arbitrary bit organizational boundaries are relevant to computer memory organization and information encoding, not data encryption.

Plaintext digital sequences can have enormous size. Therefore, for processing convenience, it is often procedurally cryptographically advantageous to subdivide plaintext bit sequences into smaller portions with an arbitrary number of bits that collectively preserve plaintext bit-ordering. Here, each digital bit is present in at least one subdivision but may be present in more than one subdivision when it is useful to increase ciphertext confusion, though that usually increases ciphertext size.

In typical practice, each bit is usually only present in one plaintext subdivision which this invention calls a segment. Hence, the plaintext segment subdivisions usually do not overlap, are mutually exclusive, and collectively exhaust the set of plaintext bits while maintaining relative bit-ordering position with one another before encryption operations commence.

In a similar fashion, segment subdivision portions can further be subdivided into plaintext sub-subdivisions and the plaintext sub-subdivisions can be further subdivided into plaintext sub-sub-subdivisions, and so on.

The sets of subdivisions, sub-subdivisions, and subdivisions, etc. collectively define a plaintext partitioning hierarchy. Members of any hierarchy level are not constrained to have the same number of bits. Thus, individual plaintext segment subdivisions are not required to have the same number of bits. Similarly, the lower-level sub-subdivisions are not constrained to have the same number of bits and yet lower-level sub-sub-subdivisions are not constrained to have the same number of bits, and so on.

However, processing performance can increase when all subdivisions can have a uniform number of bits, all sub-subdivisions can have a uniform number of bits, and all sub-sub-subdivisions can have a uniform number of bits, etc. However, to increase ciphertext confusion, it is advantageous for shaped PRV value interpretations to determine the size of the members in these various subdivisions, sub-subdivisions, sub-sub-subdivisions, etc. This introduces variability that increases unpredictable ciphertext confusion.

Not having subdivision plaintext nibble, byte, word, etc. alignment for any subdivision at any hierarchy level strengthens encryption strength at the cost of the increased computational processing required to isolate subdivisions for processing and to reassemble their encrypted counterpart contiguously. Here relaxing any requirement for plaintext nibble, byte, word, etc. alignments usually results in increased Boolean and logical shift operations that increase processing requirements.

For a four-level subdivision methodology example and description clarity, input plaintext (level 1) can be first divided into a multiplicity of segments ($S_i$) (level 2), each of which can be then subdivided into a multiplicity of fragments ($F_i$) (level 3), each of which can be then divided into a multiplicity of minces ($M_i$) (level 4) as depicted in FIG. 2. More arbitrarily named subdivision levels are possible between minces and the original plaintext sequence. In this descriptive example, a $S_{9,17,23}$ designation could identify mince 23 in Fragment 17 in Segment 9.

Note that, for small plaintext amounts or when convenient, the plaintext may only have one segment that has only one fragment. Here, the plaintext, segment, and fragment are the same size. In general, shaped floor and ceiling PRV values determine the size of segments, fragments, minces, etc. The values of the floor and ceiling values could be determined by PRV shaped value interpretations.

For clear nomenclature purposes in this example embodiment description, the lowest plaintext subdivision level is generally a mince. In general, minces may have a shaped PRV number of bits. In one example embodiment, the number of bits range between 4 and 7 bits inclusive. Minces in any fragment are not required to have the same number of bits, though they may. Similarly, fragments in a segment are not required to have the same size and plaintext segments are not required to have the same size. Minces are identified at each fragment step and redefined during each fragment processing pass regardless of processing direction (LTR or RTL).

Minces are atomic encryption units. In general, the number of bits in a mince is determined by a shaped PRV interpretation in preparation to performing a bit manipulation transformation on the mince's bit values. Once performed, a successive, independent PRV interpretation defines the next, immediately adjacent or overlapping, mince size and its encryption operations. PRV interpretation determines encryption operation order which can occur LTR or RTL from one end depending on PRV interpretation. Alternately, the operation order can occur, for example, starting in the fragment center and proceed RTL or LTR depending on PRV interpretation. It might also simultaneously proceed RTL and LTR from the starting point.

Since a complete fragment encryption operation can involve a multiplicity of fragment encryption passes, different PRV interpretations will define minces differently and different passes can travel indifferent directions—some LTR and some RTL. Consequently, bit positions at a given fragment offset will usually be included in different mince identifications with different sizes and experience different manipulations involving different bits at different fragment bit position offsets. When successively identified minces overlap in a given pass, fragment bit fractionation increases, increasing ciphertext confusion.

Note that, just as a segment may only have one fragment, a PRV interpretation may identify fragments that only have one mince, containing all fragment bits, which usually comprise significantly more than 8 bits. With such a fragment, a PRV interpretation may also identify one of its encryption operations as an existing encryption standard. ShapeShift encryption may therefore be compatible with, and support, numerous standardized encryption schemes.

Completely encrypting such a fragment in this invention may potentially involve a multiplicity of additional PRV interpreted Fisher-Yates Shuffle Algorithm fragment mince encryption operations. Such a fragment is subject to normal out-of-order reassembly operations within the encrypted segment plaintext output. This approach significantly fortifies the encryption strength of these well-known standards, thereby extending their utility and preserving their global infrastructure investments when Quantum Computers become available. For example, it can be advantageous to encrypt plaintext with an existing standard method and then shuffle and wrap the encrypted ciphertext segment and fragment hierarchy as described in this invention without performing further ShapeShift mince encryption operations. Similarly, it may be advantageous for ShapeShift to produce ciphertext which the standard encryption method then further encrypts.

Fragments usually have minces with bit positions located in two adjacent 8-bit plaintext fragment byte positions. Thus, isolating their bit values requires accessing two plaintext bytes, possibly logically right shifting the two bytes as one 16-bit value to remove all extraneous low-order bits not in the mince, and logically ANDing the resulting shifted value with a binary value that zeros the extraneous high-order bits that are not in the mince. Assembling encrypted minces into an encrypted fragment involves similar operations.

Encrypted minces do not have fewer bits than the plaintext mince had. However, if output ciphertext expansion is allowed, an encrypted mince can have more bits than the plaintext mince had, though this expansion increases reassembly processing and ciphertext size.

All atomic encryption operations occur at the mince level. Complete fragment encryption involves a multiplicity of fragment encryption passes. A given fragment encryption pass usually operates on all fragment minces, though this is not required. Each fragment encryption pass usually defines minces differently. Finally, a mince may be encrypted using a multiplicity of bit transformations in a single pass which might otherwise require a multiplicity of passes to effect.

A single mince encryption operation performed in a pass can encrypt one mince as an individual encryption operation or a multiplicity of minces as a compound mince encryption operation. An atomic encryption operation can be selected using a PRV interpretation. Hence, a given pass usually does not necessarily encrypt all fragment minces in the identical way, thereby increasing ciphertext confusion. In a complete fragment encryption operation involving multiple encryption passes, each encryption pass may define mince members differently in size and mince offset.

One objective of the example segment, fragment, and mince subdividing hierarchy is to isolate plaintext portions of convenient size for optional independent encryption. Independent encryption of subdivision elements such as segments or fragments can accelerate subsequent random access, processing, and updating of encrypted data because it is not necessary to decrypt all encrypted data preceding the desired data to decrypt the desired data. A convenient independent encryption boundary may be based on storage device logical block address (LBA) values or persistent media page and sizes such as found in NAND Flash media. In addition, a multiplicity of ephemeral, independent PRVGs can be used to support encryption and out-of-order reassembly operations.

A second objective of a subdivision hierarchy is to enable encryption and decryption operations using different threads with different core affinities on a single multi-core processor, as well as on different cores on different processors in multicore, multiprocessor configurations. In such environments, care must be exercised to ensure encrypting and decrypting processing threads correctly synchronize activities and that each receives its appropriately reconstructible, deterministic PRV sequence to perform its parallel processing activities. This may involve a multiplicity of independent PRV generators such as LFSR array complexes.

A third objective of the example subdivision hierarchy is to enable encryption operations to assemble encrypted plaintext subdivision portions out-of-order in the encrypted output.

Some historical encryption attacks have been successful by exploiting the fact that many popular file formats have header information that is relatively constant or otherwise easily located within the ciphertext, enabling successful unauthorized decryptions by deducing the encryption key. Distributing such encrypted header information throughout the encrypted output and away from the beginning of encrypted output under PRV determinism impedes such attacks. Ciphertext wrapping (FIG. 11) also helps remediate this vulnerability.

This invention teaches that using PRVs with the well-known Fisher-Yates Shuffle algorithm is an expedient and straightforward method to assemble encrypted subdivisions out-of-order deterministically.

As one example, to shuffle six subdivisions at any subdivision level, it is useful to create an unsigned integer array, such as A[6], having six elements with the initial element values A[0]=0, A[1]=1, A[2]=2, A[3]=3, A[4]=4, A[5]=5.

Shuffling the A[6] array with the Fisher-Yates Shuffle algorithm requires a sequence of descending shaped PRV values which are readily available in this invention. The end shuffled array element values define the reassembly order for the six encrypted fragment minces.

For example, the shuffled array element values may be A[0]=4, A[1]=3, A[2]=2, A[3]=5, A[4]=1, A[5]=0. The array elements may further correspond to Fragments that collectively comprise a Segment.

In this example, encrypted Fragment 4 will be the first ($0^{th}$) Fragment assembled into the encrypted Segment, encrypted Fragment 3 will be the second Fragment assembled into the encrypted Segment, encrypted Fragment 2 will be the third Fragment assembled into the encrypted Segment, encrypted Fragment 5 will be the fourth Fragment assembled into the encrypted Segment, encrypted Fragment 1 will be the fifth Fragment assembled into the encrypted Segment, and encrypted Fragment 0 will be the sixth Fragment assembled into the encrypted Segment.

When using out-of-order assembly, it is useful, though not necessary, to identify the segment and fragment subdivision scheme, as well as the out-of-order assembly scheme before encrypting the various fragments. This can significantly simplify, and thereby accelerate, subsequent decryption operations because it allows decryption operations to identify the locations of ciphertext before beginning to reverse the Shapeshift mince encryption operations. Similarly, it can be useful to perform random bit sequence blending as an initial or final fragment encryption step.

When performing out-of-order assembly, it may be advantageous to write a fragment to a Storage 120 device after encrypting it. In this instance, it may prove useful for the system's file system to support sparse files and provide file hole support. Regardless, the out-of-order assembly process will usually require the aforementioned increased Boolean and logical shift operations that increase processing requirements.

Finally, in the degenerate case where a plaintext only has one segment, out-of-order fragment assembly shuffles all encrypted plaintext fragments in one Fischer-Yates Algorithm shuffle operation at the one segment hierarchy level.

This invention teaches that the Fisher-Yates Shuffle algorithm is also useful to blend Null bits deterministically with plaintext bit sequences, during fragment encryption passes, and after all fragment encryption passes complete. Additionally, the Fisher-Yates Shuffle algorithm is also useful to shuffle ciphertext segments for out-of-order segment reassembly into final ciphertext.

For example, a maximum 15 percent expansion may be allowed for encrypted output and the system may store encrypted plaintext on storage devices using 4096-byte (32768 bit) blocks. The expansion may further be uniformly distributed over all storage blocks. 32768 divided by 1.15 gives a quotient of 28493.9. Rounding up, this means a maximum of 28494 bits of unexpanded encrypted data can go into each 32768-bit block, leaving room in the block to randomly blend 4274 random bits. The random bits are Null bits which may be CRC values, ECC values, checksum values, and the like corresponding to the 28494 bits of unexpanded encrypted data.

Blending random (or more generally NULL) bits into an encrypted bit sequence is facilitated by concatenating the random bits after the encrypted bit sequence and using the Fischer-Yates shuffle algorithm to shuffle in shaped PRV-size random bit minces, thereby creating a blended bit sequence of encrypted bits and random bits as depicted in FIG. 7. In such an operation, using a 1-bit mince size provides improved blending. Alternately, the encrypted bit sequence can be blended into the random bits. The method used may be based on PRV interpretation. A plaintext or encrypted bit sequence may be blended into random bit sequences.

In this example, note that all 4274 random bits can be blended with the plaintext in one Fisher-Yates shuffle. Alternately, some of the 4274 random bits can prepend a plaintext blended bit sequence without blending. Similarly, some random bits can append to the end of a plaintext blended sequence without blending. The remaining random bits can be blended with the plaintext to create the plaintext blended sequence.

Note that all shuffling, prepending and appending considerations are performed under PRV interpretation which controls the numbers of prepended, appended, and shuffled bits, as well as the encrypted and random bit sequence mince shuffling operations to create the blended sequence.

Plaintext fragments can have an arbitrary number of bits. For example, a fragment may have 53 or 1677 or 10 bits. A fragment's highest and lowest order fragment bit positions are not required to be on nibble, byte, or word boundaries (aligned) within the plaintext.

Practitioners skilled in the art will appreciate that blending random bits into an encrypted bit sequence in these manners obliterates any constructed organization, such as out-of-order reassembled fragments, and bit order an encoded bit sequence exhibited before the blending operation. Unlike other data encryption methods, such as the key-based Classic McEliece method proposed in the United States Department of Commerce National Institute of Standards and Technology's Post Quantum competition, ShapeShift bit blending exchanges the spatial position of encrypted bits with concatenated random bits under PRV interpretation control. This sequesters encrypted bits, simultaneously preserves their values, and increase cryptographic confusion. In contrast, the key-based Classic McEliece method intentionally destroys plaintext bit values by injecting random noise into the plaintext, recovering their values using error correction techniques derived from digital and satellite communication practices.

Fragment encryption can involve a multiplicity of encryption passes that each involve individual mince encryption operations, compound mince encryption operations, or both. Fragment encryption can begin at one end of the fragment and proceed mince-by-mince to the other end. A shaped PRV interpretation involving a PRV modulus 2 operation can be determined a left-to-right or right-to-left travel direction (FIG. 5).

Shaped PRV values determine mince sizes. In this invention example discussion, a mince has between 4-bits and 7-bits inclusive unless other considerations, such as random-bit blending, benefit from a different size. The last mince remnant in a pass may have fewer than 3 bits and may be encrypted differently or not at all. However, straightforward program logic methods, such as using a smaller mince size, can assure this situation does not arise.

There are a virtually unlimited number of individual mince encryption operations. One that essentially is a One Time Pad (OTP) cipher encryption might simply invert a multiplicity of mince bit values with an XOR operation using a shaped PVR or constant value.

Another individual mince encryption operation might arithmetically add an appropriately shaped PRV and use a Boolean AND operation to reduce the arithmetic sum to the correct number of bits. This is essentially a Caesar Cipher type encryption operation that impedes frequency analysis and brute force decryption attacks by using a PRV-based interpreted shift instead of a traditional constant shift value, thereby eliminating its fixed-mapping vulnerability to frequency and brute force analysis.

Another individual mince encryption might use Finite Field multiplication using a coefficient and characteristic polynomial that are both selected using shaped PRV value interpretations. When two minces have the same number of bits and the same bit sequence, using different PRV multipliers or characteristic polynomials usually produce different encrypted values. This PRV-based approach also impedes frequency analysis and brute force decryption analysis that conventional affine encryption attacks are vulnerable to. A hardware accelerator that performs Galois Multiplication operations such as the Galois Multiplication Hardware Accelerator Chiplet 160 accelerates this type operation. Such an accelerator uses two multiplicands and a primitive polynomial to return its operational result.

The bits in a mince might experience a multiplicity of such operations in a single fragment encryption pass, each applied a multiplicity of times, before operations move to the next identified fragment mince in the pass. Each mince is independently encrypted. PRV interpretation deterministically selects the encryption methods, operands, and their multiplicities.

Importantly, different fragment encryption passes identify fragment minces and their sizes using different, independently derived PRV shaped value interpretations. Once a mince is identified, its bit value can be preconditioned before its encryption and its encrypted value can be post-conditioned. Example preconditioning and postconditioning operations are circular bit rotations of a shaped PRV number of bits, bit mirroring, or other bit-value rearrangements.

There are also a virtually unlimited number of compound mince encryption operations involving a multiplicity of mince.

For example, it is possible to generate a PRV value stream of the same size as the plaintext and XOR the two streams together in a stream cipher One Time Pad (OTP) encryption operation before operations commence. Performing this operation after all fragment encryption and final assembly complete can complicate decryption operations, though it can be achieved and is potentially easier to decrypt when performed as a final individual fragment encryption step.

As another compound mince encryption operations example, assume a compound mince encryption operation involves three minces all having the same number of bits. It is therefore possible to consider each mince's value as a variable and use Galois Finite Field mathematics to construct three independent linear equations in the three mince variables to calculate three independent parity values using one characteristic polynomial in all calculations.

The nine coefficients of the three mince variables in the three independent equations would be non-zero, shaped PVR values. Because the parities all have the same number of bits as the three mince variables, the three parities can be collectively considered encrypted mince values. The group of parities can replace the group of mince values provided encryption and decryption operations use them consistently. The parity value positions can be shuffled as well.

Note that the three parities must be decrypted together as a set using the same shaped PRV characteristic polynomial, coefficients with the correct variables, and their generated parity. To recover the original mince values, group recovery may require using the Extended Euclid Algorithm or multiplicative inverse table-lookup references in addition to normal Galois Finite Field arithmetic operations. An Extended Euclidian Algorithm Dataflow Hardware Accelerator Chiplet 170 can significantly accelerate this operation and is well suited to Dataflow or Coarse Grained Reconfigurable Architecture (CGRA) processing, perhaps implemented in programmable logic such as a FPGA.

As another compound mince encryption operations example, a first mince may have three bits and a second mince may have 7 bits. An individual mince encryption operation may have encrypted the first mince, producing a 3-bit encrypted value. Because an individual mince encryption operation encrypted the first mince, a preceding decryption operation can independently recover its plaintext value. Therefore, the first mince's unencrypted value or encrypted value can be left shifted and XOR'ed with the second mince's unencrypted value as a data value preconditioning or post-conditioning step.

Alternately, the first mince can be re-encrypted using a different encryption method than first used to encrypt the mince, the result left shifted, and the shifted value XOR'ed with the second mince's unencrypted value as a data preconditioning step. This type of nested compound operation can involve more than two minces but introduces an additional decryption operation ordering dependency since an earlier mince's value must be recovered to decrypt a subsequent mince.

Another compound mince encryption operation uses the Fischer-Yates Shuffle Algorithm. However, the Fischer-Yates Shuffle Algorithm conventionally shuffles equal-size objects and mince sizes can vary from 4 to 7 bits in this example discussion. In practice, these values could be determined by shaped PRV interpretation using different floor and ceiling ranges. Because Shapeshift encryption works at the bit level, this invention teaches that it is possible to adapt it to shuffling variable-sized objects as depicted in FIG. 6 and FIG. 10.

FIG. 6 also shows that an identified source mince can swap its position with a target mince using PRV defined Fisher-Yates shuffling. Either, both or neither mince is encrypted before positionally swapping, all depending on PRV interpretation.

However, to simplify this example Fischer-Yates Shuffle Algorithm discussion, the fragment minces may all have the same number of bits (e.g., 5-bits). In this simplified discussion example, the Fischer-Yates Shuffle Algorithm iteratively identifies source minces and target minces using progressively descending shaped PRV values. At each shuffle step, the step first isolates a source mince's 5-bits and a target mince's 5-bits in preparation for the shuffle (position swap) operation. At this point, the encryption operation may encrypt the source, target, or both minces using individual mince encryption operations before performing the shuffle operation. Hence, this type processing combines individual and compound encryption operations, thereby creating a hybrid encryption method.

Aspects of the disclosure may operate on particularly created hardware, firmware, digital signal processors, or on a specially programmed computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a computer readable storage medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like.

Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or computer-readable storage media, which may be read and executed by one or more processors. Such instructions may be referred to as a computer program product. Computer-readable media, as discussed herein, means any media that may be accessed by a computing device. By way of example, and not limitation, computer-readable media may comprise computer storage media and communication media.

It will be appreciated that variants of the above-disclosed and other features and functions, or alternatives thereof, may be combined into many other different systems or applications.

Various presently unforeseen or unanticipated alternatives, modifications, variations, or improvements therein may be subsequently made by those skilled in the art which are also intended to be encompassed by the following claims.

The invention claimed is:

1. A system, comprising:
a plurality of processing Cores;
a Package Interconnect communicatively coupled with the plurality of processing Cores;
a Configurable LFSR PRV Generator Hardware Array means communicatively coupled with the Package Interconnect and configured to provide a plurality of LFSRs whose length, feedback polynomial, jitter value, warm up cycle count, and algorithmic feedback discard method are configurable through a register-interface accessible by the Cores through the Package Interconnect;
a Galois Multiplication Hardware Accelerator means communicatively coupled with the Package Interconnect and configured to accelerate Galois Finite Field multiplication of two multiplicands and primitive polynomial modulus division operations necessary to identify Galois Finite Field multiplicative product values;
an Extended Euclidian Algorithm Hardware Accelerator means communicatively coupled with the Package Interconnect and configured to provide Extended Euclidian Algorithm acceleration; and
a Fischer-Yates Shuffle Algorithm Hardware Accelerator means communicatively coupled with the Package Interconnect and configured to provide fragments both fixed- size and variable-sized mince shuffling and random bit blending hardware acceleration.

2. The system of claim 1, further comprising a Unified Galois Arithmetic Hardware Engine combining the Configurable LFSR PRV Generator Hardware Array means and the Galois Multiplication Hardware Accelerator means.

3. The system of claim 1 configured to interpret PRV sequences as tokens to perform encryption configuration setup, configuration, initialization, and operations.

4. The system of claim 1, further comprising a file system configured to tag I/O requests on both read and write requests with a value used to encrypt data in storage devices.

5. The system of claim 1 configured for in-flight mince encoding during Fischer-Yates swap operations before the source and target minces are both swapped into their fragment positions.

6. The system of claim 1 configured to integrate a Fischer-Yates Shuffle Algorithm adapted to shuffling non-uniform sized bit field minces.

7. The system of claim 1 configured for PRV-based out-of-order reassembly of ciphertext fragments and segments that substantially impedes cryptoanalysis attempts to break a ciphertext.

8. The system of claim 1, wherein use of variable mince sizes versus a required, uniform fixed-size.

9. The system of claim 1 configured to encrypt plaintext using a collection of PRV-selected different mince encryption techniques.

10. The system of claim 1, wherein the ability to prepend, append, and blend pseudo random or random value bits when expansion is allowed.

11. The system of claim 1 configured to use other encryption methods at the fragment level.

12. The system of claim 1 configured to use PRV values to determine at least one of the following:
a mince encryption table with a multiplicity of elements, each element comprising a multiplicity of phases;
mince encryption operations and operation operands;
determine mince sizes; and
processing direction.

13. The system of claim 1 configured to implement autonomous LFSR Polynomial hopping.

14. The system of claim 1, wherein the Configurable LFSR PRV Generator Hardware Array means is configured to impede cryptoanalysis attempts under flexible configuration control by algorithmically:
discarding LFSR feedback bits;
using a LFSR jitter value;
changing LFSR size;
changing the feedback polynomial autonomously; and
changing the LFSR state autonomously.

15. The system of claim 1 configured to use an array of different size, autonomously operating LFSRs and select them under PRV interpretation to produce on-demand PRV multi-bit values.

16. The system of claim 1 configured to shape PRVs to construct values within numeric ranges.

17. The system of claim 1 having the ability to adapt long-existing, but vulnerable fixed-mapping encryption approaches such as the Caesar Cipher and Affine Cipher without their brute force and frequency analysis attack vulnerabilities due to their fixed-mapping operations.

18. The system of claim 1 providing the ability for a client system to generate the encryption nonce initialization values by requesting and optionally using, or otherwise enhancing with a salt, a server-provided PRV token string.

19. The system of claim 1 having the ability to trade off required processing power, ciphertext output size, and encryption strength.

20. The system of claim 1, wherein the Extended Euclidian Algorithm Hardware Accelerator is configured to provide Extended Euclidian Algorithm acceleration using a Dataflow or Coarse Grained Reconfigurable Architecture (CGRA) processing methodology.

\* \* \* \* \*